United States Patent
Rajamony et al.

(10) Patent No.: US 12,488,786 B1
(45) Date of Patent: Dec. 2, 2025

(54) SPEECH RECOGNITION FOR ASSISTING PATIENTS WITH SPEECH DIFFICULTIES

(71) Applicant: ARTIK LLC, Rancho Palos Verdes, CA (US)

(72) Inventors: Karthik Rajamony, Rancho Palos Verdes, CA (US); Akshobh Karthik, Rancho Palos Verdes, CA (US)

(73) Assignee: ARTIK LLC, Rancho Palos Verdes, CA (US)

( * ) Notice: Subject to any disclaimer, the term of this patent is extended or adjusted under 35 U.S.C. 154(b) by 0 days.

(21) Appl. No.: 19/202,025

(22) Filed: May 8, 2025

Related U.S. Application Data

(60) Provisional application No. 63/762,961, filed on Feb. 25, 2025, provisional application No. 63/755,913, filed on Feb. 7, 2025.

(51) Int. Cl.
*G10L 15/06* (2013.01)
*G10L 15/08* (2006.01)
*G10L 21/02* (2013.01)

(52) U.S. Cl.
CPC .......... *G10L 15/063* (2013.01); *G10L 15/083* (2013.01); *G10L 21/02* (2013.01)

(58) Field of Classification Search
CPC ...... G10L 15/063; G10L 15/083; G10L 21/02
See application file for complete search history.

(56) References Cited

U.S. PATENT DOCUMENTS

| | | | |
|---|---|---|---|
| 11,699,360 B2 * | 7/2023 | Koul | H04M 3/42391 |
| | | | 709/206 |
| 12,249,324 B1 * | 3/2025 | Wang | G10L 25/27 |
| 2011/0054896 A1 * | 3/2011 | Phillips | G10L 15/30 |
| | | | 704/235 |
| 2014/0214426 A1 * | 7/2014 | Kanevsky | G10L 15/08 |
| | | | 704/251 |
| 2016/0104477 A1 * | 4/2016 | Burkhardt | G10L 13/02 |
| | | | 704/243 |
| 2020/0279549 A1 * | 9/2020 | Burns | G10L 21/003 |
| 2020/0312302 A1 * | 10/2020 | Lin | G10L 15/063 |
| 2021/0225384 A1 * | 7/2021 | Lin | G10L 25/66 |
| 2022/0301563 A1 * | 9/2022 | Chang | G10L 15/24 |
| 2023/0139394 A1 * | 5/2023 | Krishna | G10L 15/24 |
| | | | 704/232 |
| 2023/0290353 A1 * | 9/2023 | McNair | G10L 25/66 |
| 2024/0347064 A1 * | 10/2024 | Li | G06N 3/045 |
| 2024/0361827 A1 * | 10/2024 | McNulty | G10L 25/63 |
| 2025/0006182 A1 * | 1/2025 | Ingel | G06F 40/30 |
| 2025/0104689 A1 * | 3/2025 | Sharma | G10L 21/10 |

* cited by examiner

*Primary Examiner* — Michael Colucci
(74) *Attorney, Agent, or Firm* — Fresh IP PLC; Clifford D. Hyra; Aubrey Y. Chen

(57) ABSTRACT

Disclosed herein are novel speech recognition methods and systems for assisting users or patients that have speech difficulties (e.g., as a symptom of one or more disorders or conditions). Specifically disclosed are speech recognition methods and systems that enable dysarthria patients to communicate more clearly and effectively.

19 Claims, 15 Drawing Sheets

400

```
training_args = Seq2SeqTrainingArguments(
    output_dir="./voice-clone-large-finetune-final",
    per_device_train_batch_size=8,
    gradient_accumulation_steps=2,
    learning_rate=1e-5,
    warmup_steps=500,
    max_steps=5000,
    gradient_checkpointing=True,
    fp16=True,
    eval_strategy="steps",
    per_device_eval_batch_size=8,
    predict_with_generate=True,
    generation_max_length=225,
    save_steps=250,
    eval_steps=250,
    logging_steps=25,
    report_to=["wandb"],
    load_best_model_at_end=True,
    metric_for_best_model="wer",
    greater_is_better=False,
    push_to_hub=True,
    save_total_limit=2
)
```

| Training Loss | Epoch | Step | Validation Loss | Wer |
|---|---|---|---|---|
| 0.1607 | 0.8460 | 250 | 0.5163 | 25.9413 |
| 0.0598 | 1.6920 | 500 | 0.4849 | 24.8444 |
| 0.0257 | 2.5381 | 750 | 0.4450 | 30.4180 |
| 0.0141 | 3.3841 | 1000 | 0.4369 | 19.3003 |
| 0.0029 | 4.2301 | 1250 | 0.4267 | 16.0095 |
| 0.0015 | 5.0761 | 1500 | 0.4209 | 18.4109 |
| 0.0063 | 5.9222 | 1750 | 0.4259 | 19.3300 |
| 0.0016 | 6.7682 | 2000 | 0.4341 | 17.7587 |
| 0.0009 | 7.6142 | 2250 | 0.4121 | 17.0471 |
| 0.0013 | 8.4602 | 2500 | 0.4199 | 16.3653 |
| 0.0009 | 9.3063 | 2750 | 0.4233 | 16.5135 |
| 0.001 | 10.1523 | 3000 | 0.4237 | 16.0688 |
| 0.0019 | 10.9983 | 3250 | 0.4230 | 16.4542 |
| 0.0014 | 11.8443 | 3500 | 0.4292 | 15.8316 |
| 0.0007 | 12.6904 | 3750 | 0.4291 | 15.8316 |
| 0.0005 | 13.5364 | 4000 | 0.4321 | 15.3869 |
| 0.0009 | 14.3824 | 4250 | 0.4334 | 15.2980 |
| 0.001 | 15.2284 | 4500 | 0.4344 | 15.2980 |
| 0.0 | 16.0745 | 4750 | 0.4372 | 15.3572 |
| 0.0 | 16.9205 | 5000 | 0.4377 | 15.3572 |

502 (highlighted first data row)
504 (highlighted last data row)

SPEECH RECOGNITION FOR ASSISTING PATIENTS WITH SPEECH DIFFICULTIES

FIELD

The disclosure relates generally to novel speech recognition methods and systems for assisting users or patients that have speech difficulties (e.g., as a symptom of one or more disorders or conditions). In particular, the disclosure relates to speech recognition that enables dysarthria patients to communicate more clearly.

CROSS-REFERENCE TO RELATED APPLICATION

This application claims the benefit of U.S. Provisional Application Nos. 63/755,913, filed Feb. 7, 2025, and 63/762,961, filed Feb. 25, 2025, which are hereby incorporated by reference in their entireties.

BACKGROUND

Although automated speech recognition (ASR) systems are common in modern technology (e.g., in mobile devices, mobile applications, smartphones, computer devices, virtual assistants, voice-assistance software, and the like), such systems struggle in understanding speech that may be unclear or less-than-ideally articulated.

In particular, current ASR systems often fail to correctly process and understand the speech of users who have speech difficulties or various medical conditions or disorders, including, for instance, neurological disorders, dysarthria, and the like.

Indeed, existing ASR systems often have a high word error rate, and make an excessive amount of mistakes, when transcribing the speech of users who have speech difficulties. Accordingly, such users cannot use existing ASR systems or software for necessary daily tasks, such as sending text or short message service (SM S) messages, controlling smartphones or other smart devices, using speech-to-text applications, and the like.

Given the foregoing, there exists a significant need for novel technologies that enable users with speech difficulties or speech disorders to communicate more clearly and effectively, including software solutions, mobile applications, etc. that correctly transcribe the speech of such users.

SUMMARY

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description.

In certain embodiments, the disclosed embodiments may include one or more of the features described herein.

In general, the present disclosure is directed to novel speech recognition methods and systems for assisting users or patients that have speech difficulties (e.g., dysarthria patients).

In at least one embodiment, a speech recognition system is disclosed that comprises one or more language and/or speech recognition models that are tuned and/or trained with specialized datasets that include examples of speech from individuals with speech difficulties, speech disorders, neurological disorders, and the like.

In at least one embodiment, the novel speech recognition system utilizes voice cloning and/or speech synthesis to generate a plurality of speech samples that mimic the speech of individuals with speech difficulties (including, e.g., dysarthric speech).

In at least one embodiment, the novel speech recognition system is incorporated into one or more software applications (including, for instance, Internet applications, mobile applications, etc.) that provide speech-to-text services, transcription services, scheduling services, and the like.

In at least one embodiment, the speech recognition system and/or speech recognition model is integrated into a voice agent to allow patients to control smart devices, including, for instance, Internet of Things (IoT) devices, smart lights, smart appliances, doors, home assistants, and the like, using voice commands that can be understood.

In at least one embodiment, the speech recognition system tracks the progression of one or more disorders that a user or patient has by monitoring changes in their speech patterns to detect possible degradation in speech.

These and further and other objects and features of the invention are apparent in the disclosure, which includes the above and ongoing written specification, as well as the drawings.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art. The invention will be more particularly described in conjunction with the following drawings wherein:

FIG. 4 shows a non-limiting example of a training configuration for a speech recognition system, according to at least one embodiment.

FIG. 5 shows various training iterations of a speech recognition system, according to at least one embodiment.

DETAILED DESCRIPTION

Figure 1:
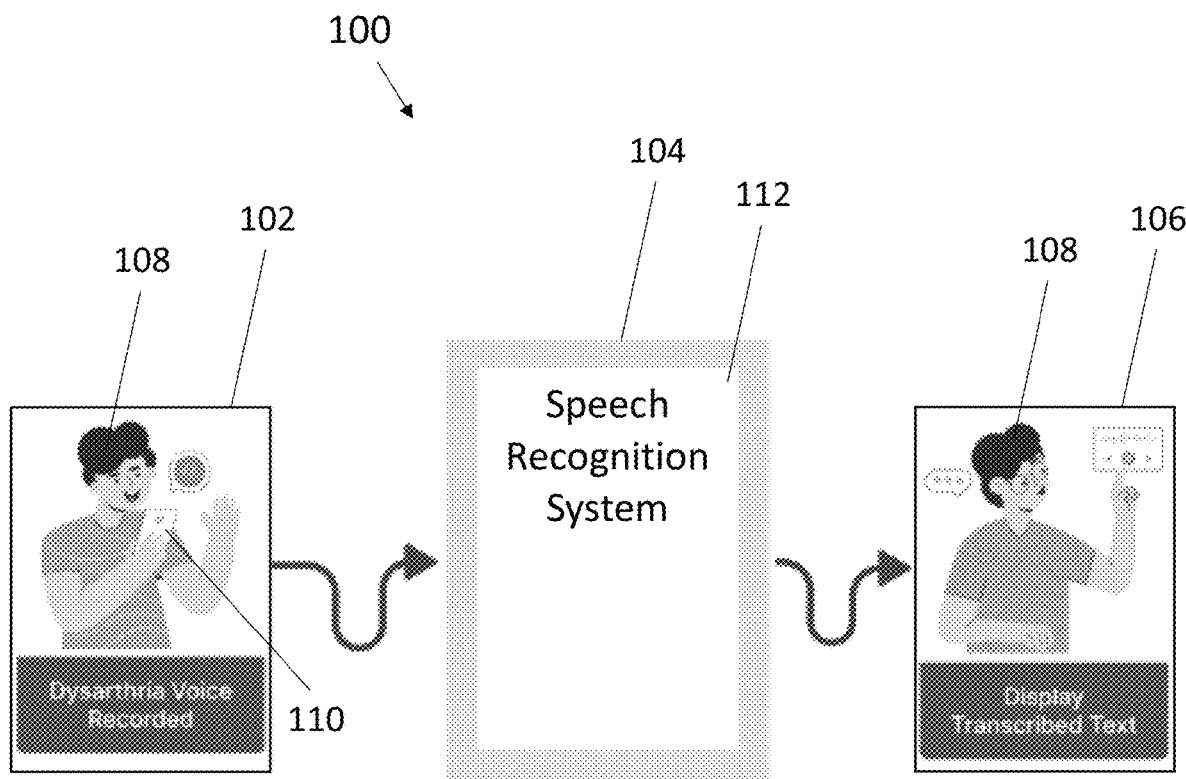
FIG. 1 shows an overview of a speech recognition system, according to at least one embodiment.

The present invention is more fully described below with reference to the accompanying figures.

The following description is exemplary in that several embodiments are described (e.g., by use of the terms "preferably," "for example," or "in one embodiment"); however, such should not be viewed as limiting or as setting forth the only embodiments of the present invention, as the invention encompasses other embodiments not specifically recited in this description, including alternatives, modifications, and equivalents within the spirit and scope of the invention. Further, the use of the terms "invention," "present invention," "embodiment," and similar terms throughout the description are used broadly and not intended to mean that the invention requires, or is limited to, any particular aspect being described or that such description is the only manner in which the invention may be made or used. Additionally, the invention may be described in the context of specific applications; however, the invention may be used in a variety of applications not specifically described.

The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may effect such feature, structure, or characteristic in connection with other embodiments whether or not explicitly described.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail. Any signal arrows in the drawings/figures should be considered only as exemplary, and not limiting, unless otherwise specifically noted. Further, the description is not to be taken in a limiting sense, but is made merely for the purpose of illustrating the general principles of the invention, since the scope of the invention is best defined by the appended claims.

It will be understood that, although the terms first, second, etc. may be used herein to describe various elements, these elements should not be limited by these terms. These terms are only used to distinguish one element from another. Purely as a non-limiting example, a first element could be termed a second element, and, similarly, a second element could be termed a first element, without departing from the scope of example embodiments. As used herein, the term "and/or" includes any and all combinations of one or more of the associated listed items. As used herein, "at least one of A, B, and C" indicates A or B or C or any combination thereof. As used herein, the singular forms "a", "an," and "the" are intended to include the plural forms as well, unless the context clearly indicates otherwise. It should also be noted that, in some alternative implementations, the functions and/or acts noted may occur out of the order as represented in at least one of the several figures. Purely as a non-limiting example, two figures shown in succession may in fact be executed substantially concurrently or may sometimes be executed in the reverse order, depending upon the functionality and/or acts described or depicted.

As used herein, ranges are used herein in shorthand, so as to avoid having to list and describe each and every value within the range. Any appropriate value within the range can be selected, where appropriate, as the upper value, lower value, or the terminus of the range.

"About" means a referenced numeric indication plus or minus 10% of that referenced numeric indication. For example, the term "about 4" would include a range of 3.6 to 4.4. All numbers expressing quantities used in the specification are to be understood as being modified in all instances by the term "about." Accordingly, unless indicated to the contrary, the numerical parameters set forth herein are approximations that can vary depending upon the desired properties sought to be obtained. At the very least, and not as an attempt to limit the application of the doctrine of equivalents to the scope of any claims, each numerical parameter should be construed in light of the number of significant digits and ordinary rounding approaches.

The words "comprise," "comprises," and "comprising" are to be interpreted inclusively rather than exclusively. Likewise, the terms "include," "including," and "or" should all be construed to be inclusive, unless such a construction is clearly prohibited from the context. The terms "comprising" or "including" are intended to include embodiments encompassed by the terms "consisting essentially of" and "consisting of." Similarly, the term "consisting essentially of" is intended to include embodiments encompassed by the term "consisting of." Although having distinct meanings, the terms "comprising," "having," "containing," and "consisting of" may be replaced with one another throughout the description of the invention.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Wherever the phrase "for example," "such as," "including" and the like are used herein, the phrase "and without limitation" is understood to follow unless explicitly stated otherwise.

"Typically" or "optionally" means that the subsequently described event or circumstance may or may not occur, and that the description includes instances where said event or circumstance occurs and instances where it does not.

In general, the word "instructions," as used herein, refers to logic embodied in hardware or firmware, or to a collection of software units, possibly having entry and exit points, written in a programming language, such as, but not limited to, Python, R, Rust, Go, SWIFT, Objective-C, Java, JavaScript, Lua, C, C++, or C#. A software unit may be compiled and linked into an executable program, installed in a dynamic link library, or may be written in an interpreted programming language such as, but not limited to, Python, R, Ruby, JavaScript, or Perl. It will be appreciated that software units may be callable from other units or from themselves, and/or may be invoked in response to detected events or interrupts. Software units configured for execution on computing devices by their hardware processor(s) may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. Generally, the instructions described herein refer to logical modules that may be combined with other modules or divided into sub-modules despite their physical organization or storage. As used herein, the term "computer" is used in accordance with the full breadth of the term as understood by persons of ordinary skill in the art and includes, without limitation, desktop computers, laptop computers, tablets, servers, mainframe computers, smartphones, handheld computing devices, and the like.

In this disclosure, references are made to users performing certain steps or carrying out certain actions with their client computing devices/platforms. In general, such users and their computing devices are conceptually interchangeable. Therefore, it is to be understood that where an action is shown or described as being performed by a user, in various implementations and/or circumstances the action may be performed entirely by the user's computing device or by the user, using their computing device to a greater or lesser extent (e.g. a user may type out a response or input an action, or may choose from preselected responses or actions generated by the computing device). Similarly, where an action is shown or described as being carried out by a computing device, the action may be performed autonomously by that computing device or with more or less user input, in various circumstances and implementations.

In this disclosure, various implementations of a computer system architecture are possible, including, for instance, thin client (computing device for display and data entry) with fat server (cloud for app software, processing, and database), fat client (app software, processing, and display) with thin server (database), edge-fog-cloud computing, and other possible architectural implementations known in the art.

The terms "subject," "patient," or "user," which are used interchangeably herein, refer to a vertebrate, such as a mammal (e.g., a human) that has difficulties, whether temporary or permanent, with speech, including, for instance, articulating or speaking clearly such that other individuals are able to understand them. Such individuals may, but do not necessarily have, a disease or disorder whose symptoms cause speech difficulties. Non-limiting examples of such diseases or disorders include, for instance, dysarthria, dysphagia, apraxia, neurological orders such as Parkinson's disease, amyotrophic lateral sclerosis (ALS), cerebral palsy, aphasia, etc. A "patient" can specifically refer to an individual that has been diagnosed with a particular disease, condition, and/or indication that results in speech difficulties and can therefore be assisted by one or more embodiments of the invention disclosed herein.

Generally, the present disclosure is directed towards novel speech recognition methods and/or systems for assisting users or patients that have speech difficulties. At least one embodiment comprises speech recognition technology that enables patients having one or more disorders (e.g., dysarthria, dysphagia, apraxia, neurological orders such as Parkinson's disease, amyotrophic lateral sclerosis (ALS), cerebral palsy, aphasia, and the like) to communicate more clearly and/or effectively with other individuals. Thus, embodiments of the invention disclosed herein can be used by users or patients to assist, attenuate, and/or ameliorate an injury, disease, symptom, disorder, pathology, and/or condition, and/or pathological condition, including any objective or subjective parameter such as, for instance, abatement, remission, diminishing of symptoms or making the condition more tolerable to the patient, slowing the rate of degeneration or decline (e.g., the rate of speech degeneration or decline), making the final point of degeneration less debilitating, and/or improving a subject's physical or mental well-being.

In at least one embodiment, a speech recognition system is disclosed that comprises one or more language and/or speech recognition models that are tuned and/or trained with specialized datasets that include examples of speech from individuals with speech difficulties, speech disorders, neurological disorders, and the like. The model can further be enhanced with voice cloning and/or speech synthesis to enable recognition of speech from individuals with speech difficulties, slurred speech, etc.

Accordingly, embodiments of the invention perform better than currently-available speech recognition systems and models for understanding and/or transcribing speech from individuals with speech difficulties, speech disorders, neurological disorders, and the like. In particular, embodiments include models trained on datasets with speech difficulties (e.g., dysarthric speech datasets), which is not done in currently-available speech recognition systems. At least one of such dataset may include artificial intelligence (AI)-generated dysarthric speech samples, synthesized dysarthric speech samples, cloned dysarthric speech samples, and the like. One non-limiting method of determining the success of any given speech recognition system or model in understanding the speech of a given individual is Word Error Rate (WER).

WER is a known statistic that is calculated by the equation $(S+D+I)/N$, where S is the number of substitutions (i.e., wrong words) in a given voice sample, D is the number of deletions (i.e., missing words) in the sample, I is the number of insertions (i.e., extra words) in the sample, and N is the total number of words in the sample.

Known speech recognition systems and models often use datasets that have an extremely limited number of samples of impaired speech, including, for instance, less than 10 samples of speech from dysarthric speakers, leading to a WER of about 90% or greater in understanding and/or transcribing speech from individuals with speech difficulties, including, for instance, speech from individuals with dysarthria (referred to herein as "dysarthric speech").

In at least one embodiment, the speech recognition system described herein comprises a speech recognition model that is trained on dysarthric speech samples that are categorized into different severity levels (e.g., mild, moderate, and severe) to improve accuracy across different impairment levels. In at least one example, the model is tested on one or more different datasets than the one(s) on which it was trained, which is different than currently-available speech recognition systems. The at least one embodiment reduces the aforementioned WER by about 70% for severe dysarthric speech, by about 50% for moderately severe dysarthric speech, and by about 54% for mildly severe dysarthric speech. Categorization of dysarthria/speech impediments based on severity into levels such as mild, moderate, and/or severe may be performed in accordance with established practice in speech pathology (e.g., Frenchay Dysarthria Assessment (FDA-2), Speech Intelligibility Rating Scale (SIR), UA Speech Severity Scale, and other speech severity scales). Speech impediment severity discussed with respect to specific embodiments herein use UA Speech severity classification with custom grouping. UA Speech classifies dysarthria severity into five categories (A to E) based on speech intelligibility and WER. In the custom grouping used in some embodiments of the present invention, these A-E categories are grouped these Severe (E & D), Moderate (C & B), and Mild (A) categories. Mild dysarthria can be identified by mostly intelligible speech with minor articulation issues, moderate dysarthria can be identified by partial speech intelligibility with some speech distortion, and severe dysarthria can be identified by a high amount of speech distortion with low intelligibility. Additionally, in at least one example, WER can be used as an indirect measure of severity, with a high WER (e.g., about 80-90%) typically indicating severe dysarthria and a low WER (e.g., about 10-30%) typically indicating mild dysarthria, and a moderate WER (e.g., about 30-80%) typically indicating moderate dysarthria. These WER values are for known, prior art speech-recognition systems. Classifying speech samples by severity of impediment and tracking accuracy for each classification independently was found to achieve better results in terms of broad accuracy across classes. Without classification, models may achieve overall performance improvements by "specializing" in one or more severities, at the expense of others-particularly when available data for some severities is less than for others.

In at least one embodiment, the novel speech recognition system utilizes voice cloning and/or speech synthesis to generate a plurality of speech samples that mimic the speech of individuals with speech difficulties (including, e.g., dysarthric speech). In at least one example, voice cloning comprises utilizing machine learning (ML) to replicate a speaker's voice from a plurality of voice samples. In at least another example, speech synthesis comprises converting text into human-like speech, for example using deep learning technologies. Voice cloning and speech synthesis generally are well known. However, in embodiments of the present invention the voice cloning model was trained on actual dysarthric speech to maintain speech impairment in synthesized voices, and synthetic speech was generated to mimic real dysarthric articulation, which is new.

In at least one example, such synthetic speech was generated using a two-step approach that mimics realistic articulation patterns present in dysarthric speech. First, a text-to-speech model was fine-tuned on dysarthric speech samples. The fine-tuning process involved training the model on real dysarthric audio samples from various datasets, resulting in generated speech that inherits the unique patterns, distortions, and pauses typical of dysarthric speakers. This approach allows the text-to-speech model to learn the speech characteristics of dysarthric individuals, leading to synthetic speech that mimics real dysarthric articulation. Second, text input was modified to simulate common dysarthric speech patterns (e.g., introducing phoneme distortions, altered pacing, and prolonged vowel/consonant sounds), which mimic dysarthric articulation. The modified text was then fed into the fine-tuned text-to-speech model, further enhancing realistic articulation errors. Notably, unlike conventional text-to-speech models, which produce fluent speech, the aforementioned model preserves articulation distortions, meaning that it can be used as a tool for training speech recognition models, as described further below herein.

These methods solve the problem of limited datasets for dysarthric speech samples, without requiring real patient recordings. Moreover, prior art models do not use voice cloning and speech synthesis in tandem. It has been discovered that a mix of real, cloned, and synthesized speech leads to a significant reduction in WER, up to 70% for sever dysarthria, with voice cloning generating realist, patient-specific dysarthric speech while speech synthesis created diverse utterances from dysarthric TTS models to ensure better ASR generalization. The plurality of generated speech samples may be integrated into one or more datasets, including, for instance, the specialized datasets described herein, to further expand the pool of data available to the speech recognition system to understand the speech of any given speech-impaired individual. In at least one example, both voice cloned samples and synthesized samples are used for training the speech recognition model to expand training data, reduce overfitting, and enhance accuracy, producing a more robust model for identifying dysarthria and/or other speech impediments.

In at least one embodiment, the novel speech recognition system is incorporated into one or more software applications (including, for instance, Internet applications, mobile applications, etc.) that provide speech-to-text services, transcription services, scheduling services, and the like. In at least one example, the system is integrated into an Internet application and/or mobile application that allows users to upload and/or record their speech and receive an accurate transcription of their speech. Such transcriptions can be performed in real time or near real time, enabling the transcriptions to be used for daily communication or other tasks that require accurate communication between a speech-impaired individual and other individuals. In at least a further example, the Internet application and/or mobile application utilizes cloud-based services, including cloud-based artificial intelligence (AI) services to enable large-scale usage. The Internet application and/or mobile application can be accessible using any available software, including, for instance, any Internet browser, thereby eliminating the need for expensive and/or specialized speech recognition and/or transcription devices.

In at least one embodiment, the speech recognition system comprises a speech recognition model that is further trained with a plurality of noise-augmented datasets, thereby improving speech recognition of speech-impaired individuals in noisy environments or environments with significant amounts of background noise.

In at least one embodiment, the speech recognition system and/or speech recognition model is integrated into a voice agent to allow patients to control smart devices, including, for instance, Internet of Things (IoT) devices, smart lights, smart appliances, doors, home assistants, and the like, using voice commands that can be understood. For instance, a patient with Parkinson's disease can articulate a verbal command to turn on one or more lights, and the voice agent processes the command and controls a smart device to turn on the one or more lights, enabling hands-free control. In at least one example, the voice agent comprises one or more instructions incorporating artificial intelligence (AI) either in whole or in part.

In at least one embodiment, the speech recognition system tracks the progression of one or more disorders that a user or patient has by monitoring changes in their speech patterns to detect possible degradation in speech. In at least one example, the system monitors WER over time and can send such data to the patient's physician to either prompt treatment, assess the effectiveness of existing treatment on the patient, etc.

Turning now to FIG. 1, an overview 100 of a speech recognition system according to at least one embodiment of the invention is shown. FIG. 1 illustrates the use of such a system for dysarthria, although the system can, as described herein, be used for a plurality of different disorders, including, e.g., dysphagia, apraxia, neurological orders such as Parkinson's disease, amyotrophic lateral sclerosis (ALS), cerebral palsy, aphasia, etc.

Patients afflicted with these and other disorders often have speech difficulties. In particular, dysarthria is a motor speech disorder affecting articulation and intelligibility resulting from abnormalities in the strength, speed, and/or accuracy of motor movements required for speech production. Dysarthria is often linked to other conditions such as cerebral palsy (affecting about 40% of patients), ALS (affecting about 80% of patients), and other neurodegenerative disorders. The effects of dysarthria can manifest in inefficiencies in the fluctuation of sounds, slurred or unclear sounds, lack of a proper rhythm, etc., which makes it challenging for other individuals to understand the structure of words and/or sentences spoken by the dysarthria patient. Patients therefore often experience difficulty in communicating with others in their daily lives, as well as additional symptoms such as vocal strain, ataxic symptoms, spastic movement, and depression.

As shown in block 102, a dysarthria patient 108 first records their voice into a device 110, which may be a mobile phone or any other device that can record audio or speech. Then, at block 104, the voice recording is passed through the speech recognition system 112, which then understands the patient's speech and transcribes the speech sample for the patient 108, as shown at block 106. The patient can then use the transcription for further communication to one or more other individuals (e.g., by showing the individuals the transcription on their device 110).

Figure 2:
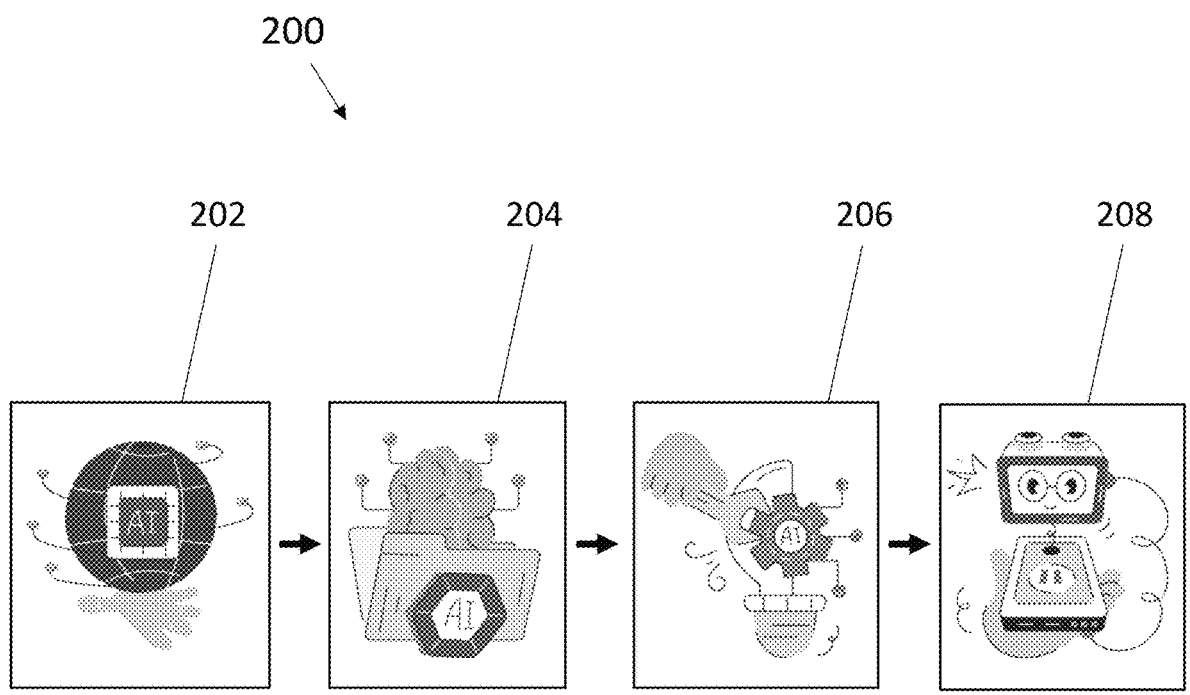
FIG. 2 shows an overview of the functioning of such a speech recognition system in a software application, according to at least one embodiment.

As described above herein, the speech recognition system can be integrated into one or more software applications, including Internet applications or mobile applications. FIG. 2 shows an overview 200 of the functioning of such a speech recognition system in a software application. First, at block 202, a speech recognition model is generated. The model may, in at least one example, utilize AI. Then, at block 204, initial training data is collected, which can be used to train the model.

The model may then further be trained and/or fine-tuned at block 206 with a plurality of additional datasets that include speech samples and/or speech patterns that contain speech abnormalities. These datasets may be samples collected from individuals with speech difficulties, voice cloned samples, synthesized speech samples, etc. In at least one example, speech samples in one or more such datasets may be pre-classified with a severity of speech abnormality, including, for instance, a three-tier ranking of mild speech impediment, moderate speech impediment, and severe speech impediment. The datasets can then be analyzed using a variety of metrics (e.g., WER, training loss, validation loss, etc.) to compare different speech samples in each such dataset and/or across datasets. Training loss and validation loss are known metrics.

Training loss generally measures how well a model performs on a training dataset and is the error between the model's predicted output and the actual labels (ground truth) during training. Training loss quantifies how well the model performs on each dataset during each iteration, and may be calculated as follows. The model makes predictions on the training data, which are then compared to the actual labels (ground truth). A known loss function (e.g., Cross-Entropy Loss for classification, Mean Squared Error for regression) calculates the difference between the predicted and actual values). The average loss across all training samples results in the training loss for that batch or epoch. Thus, a lower training loss equates to a better model fit on the training data.

Validation loss generally measures a model's performance on a separate dataset (often referred to as a "validation dataset") that the model has not seen before. Validation loss measures how well the model generalizes to unseen validation data, which helps detect overfitting; if the training loss is low but the validation loss is high, the model may be memorizing instead of learning patterns. Validation loss can be calculated as follows. After each epoch, the model evaluates a separate validation dataset that it has not seen before. The predictions on the validation set are then compared with the actual labels, and the same loss function as the one used for calculating training loss is applied to calculate the average error. The final validation loss is then computed as the average loss over all validation samples. A lower validation loss equates to better generalization. Both training loss and validation loss are typically plotted during training to observe the model's performance over time. If the model is underfitting, then both training loss and validation loss may be high. If the model is overfitting, then training loss may be low, but validation loss may be high. However, if the model has generalized well, then both training loss and validation loss may be low and stable.

In at least one example, the additional training and/or fine-tuning of the model includes the usage of dysarthric voice samples and/or voice samples showcasing speech difficulties common in one or more disorders. These samples may include, for instance, one word utterances, multiple word utterances (e.g., imperative sentences), and the like. As described above herein, voice cloning and/or speech synthesis for one word utterances and/or multiple word utterances may be used. Voice samples and/or datasets may also be categorized based on severity scales (including, for instance, the three levels of speech abnormality described above herein) to ensure balanced training and/or testing of the model.

Finally, the model may be integrated into a software application, as shown at block 208. The application may, in at least one example, be operable on a user's computing device, including a mobile phone. The software application may prompt the user to input their own voice and/or choose a specific voice file containing different speech samples (e.g., pre-recoded speech samples of common commands, questions, statements, and the like), transcribe the user's voice and/or specific voice file chosen, and output the transcription. The output may be a textual transcription and/or a synthesized vocalization of the transcription.

In at least one embodiment, voice cloning datasets are created using one or more text-to-speech models that may include deep learning and/or AI technologies. This results in cloned voice samples that replicate the speech patterns of dysarthric patients, making the training data more authentic than known voice samples that do not have speech impediments. The datasets may include imperative sentences (that is, sentences of at least 3 words). Audio files from datasets containing actual speakers and actual speech may be used as a starting point. After voice cloned files are generated, excessively garbled or hallucinated voice files may be removed. In at least one embodiment, the speech recognition model is trained on datasets containing dysarthric speech samples, and voice cloning is then used to replicate dysarthric articulation.

In at least one embodiment, datasets containing synthesized speech samples can be created using one or more text-to-speech (TTS) models that may include deep learning and/or AI technologies. As noted previously, TTS models generally are well known, however in some embodiments of the present invention such TTS models are trained on dysarthric speech in order to synthesize dysarthric speech samples. In at least one example, the text-to-speech models can synthesize the voices of dysarthria patients, and can be trained over about 10 hours and about 120,000 steps. In the aforementioned at least one example, no pre-processing was required and no hallucinated voice files were generated. In at least another example, new dysarthric speech samples are created by training models on existing patient recordings and then generating (e.g., using AI) additional realistic utterances similar to the actual utterances in the patient recordings. This process permits augmenting datasets without the need for extensive patient recordings. Additionally, synthetic variations of dysarthric speech in at least one example improve model adaptability and accuracy across different severity levels.

Figure 3:
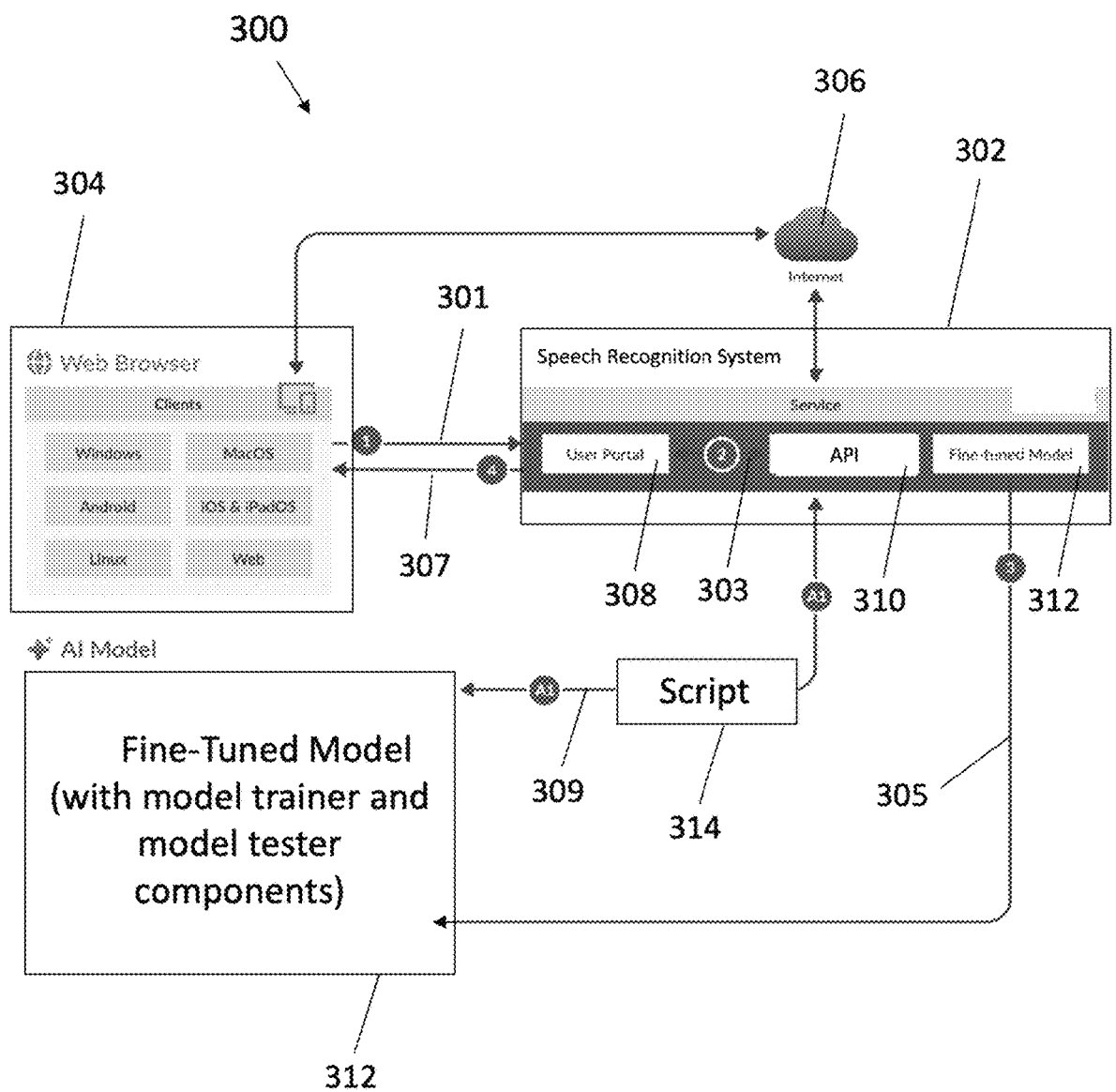
FIG. 3 is a diagram of a speech recognition system and how such a system can be accessed and used by a user, according to at least one embodiment.

FIG. 3 is a diagram 300 of a speech recognition system according to at least one embodiment of the invention and how such a system can be accessed and used by a user. First, as shown in step 301, a user accesses speech recognition system 302 via an Internet browser 304 that is connected to the Internet 306. The system 302 comprises a user portal 308, which is displayed to the user on the browser 304, an application programming interface (API) 310, and a speech recognition model 312 according to an embodiment of the invention.

The system 302 can then prompt (e.g., via a prompt displayed on a graphical user interface (GUI)) the user to record their voice. Upon receipt of a voice recording, the system 302 processes the voice signals and, as shown in step 303, sends the voice signals, via the API 310, to the model 312.

At step 305, the model 312 then transcribes the voice signals to text. The system 302 then displays the text transcription to the user, who views it on their browser 304, as shown at step 307.

Operation of the model includes, for instance, pulling a script 314 to the model, one or more components of which (e.g., a model trainer component and/or a model tester component) can be stored on a server, as shown at step 309. Then, the model trainer component generates a dataset and can upload it to a database to be accessed or used by others. The model is then further trained and/or fine-tuned. The model tester can then test the further trained and/or fine-tuned model.

In at least one embodiment, training and/or fine-tuning of the model includes the specific configuration 400 shown in FIG. 4. This specific configuration includes fine-tuning parameters that are used to improve the speech recognition model's performance on dysarthric speech, in addition to preventing overfitting and/or underfitting.

In at least one example, early stopping based on WER stabilization (as opposed to validation loss) is used. WER stabilization refers to the point during training where the model's WER stops significantly improving across validation steps, meaning that additional fine-tuning no longer yields substantial performance gains. WER may be monitored across multiple evaluation checkpoints (for example, every 250 steps) to determine when stabilization has occurred. In some exemplary embodiments, WER is evaluated at each evaluation checkpoint (e.g. every 250 steps) and if WER remains unchanged or fluctuates within a small threshold (e.g. <0.5% change, or <0.3% change, or less than 0.1% change) over multiple consecutive evaluation checkpoints (e.g. three consecutive evaluation checkpoints, or two consecutive evaluation checkpoints), training may be halted, even if validation loss is still decreasing. This prevents overfitting by stopping training before the model starts memorizing training data instead of generalizing. WER stabilization achieved better results than monitoring validation loss alone, because lower validation loss does not always correspond to better speech recognition accuracy. A model can have decreasing validation loss but still misinterpret words in dysarthric speech. WER stabilization optimizes the model for real-world performance.

Additionally, optimizing fine-tuning parameters may, in at least one example, help achieve reductions in WER. Dysarthric speech in particular has unique challenges, including, for instance, low articulation, pauses, inconsistent pronunciations, and the like. Fine-tuning optimized learning rate, batch size, and gradient accumulation steps helps adapt to these variations and assists the model in learning efficiently from dysarthric speech data. Parameters may be fine-tuned by, for example, grid search (testing multiple parameter combinations), progressive scaling (starting with smaller values and increasing them based on performance trends) and/or empirical analysis (studying loss curves, WER, and training stability). In some embodiments of the present invention, learning rate is preferably between 0.0001 and 0.000001, and more preferably 0.00001. Learning rates that are too high may cause instability, causing a failure to converge, while rates that are too low may lead to very slow leaning, requiring excessive training steps.

In some embodiments of the present invention, batch size is preferably between 2 and 32, and more preferably 8. Batch sizes that are too high may lead to GPU memory overflow on standard hardware, while sizes that are too low may cause noisy gradient updates, reducing stability. In some embodiments of the present invention, gradient accumulation steps are preferably 2. This helps to effectively simulate a larger batch size for stable training. In some embodiments of the present invention, warmup steps are preferably 500. This allows a smooth ramp-up to the final learning rate, preventing initial instability. Generally, the term "warmup steps" refer to the initial phase of training where the learning rate gradually increases from a very small value to the target learning rate over a fixed number of steps (e.g., 500 steps in this case). This technique helps stabilize training and prevent sudden weight updates that could destabilize the model. The model begins with a very low learning rate at the start (instead of using the full learning rate), and then adjusts slowly, avoiding large weight updates. After the warmup phase, the learning rate continues as per the scheduled decay (e.g., cosine decay or step decay). The ideal number of warmup steps can vary based on the dataset, model size, and optimizer settings. In at least one example, and as described above herein, 500 warmup steps is a moderate number of warmup steps that improves convergence and prevents early-stage instability. In some embodiments of the present invention, max steps are in the range of 4,000 to 5,000, and more preferably 5,000. Max steps may be chosen based on WER stabilization trends. Most models were found to converge within 4,000-5,000 steps, making additional steps unnecessary. In some embodiments of the present invention, steps between evaluation checkpoints are preferably 250. Frequent evaluation ensures WER trends are captured early, making it easier to detect stabilization. In some embodiments of the present invention, training is stopped if WER does not improve significantly over three consecutive evaluation checkpoints. This helps to avoid overfitting. Optimized parameters such as these may achieve a preferred balance between accuracy, generalization, and training efficiency. Optimal parameters may vary based on dataset, training parameters and model type used. Starting with the values described, and using the tools/methods for determining optimal values noted above, optimal parameters for any given application may be determined.

In at least one embodiment, the fine-tuning process comprises adapting a trained speech recognition model to dysarthric speech by adjusting one or more parameters, using severity-based training (e.g., mild, moderate, and/or severe) to ensure model generalization, applying dataset augmentation (e.g., voice cloning and/or speech synthesis) to improve model robustness, and monitoring WER instead of validation loss.

A non-limiting example of training iterations is shown in FIG. 5. A set of training iterations 500 begins with a WER of about 26 at initial iteration 502, and finishes with a WER of about 15 at final iteration 504. In at least one example, training the model with a set of iterations may take, for instance, about 3-4 hours.

Figure 6A:
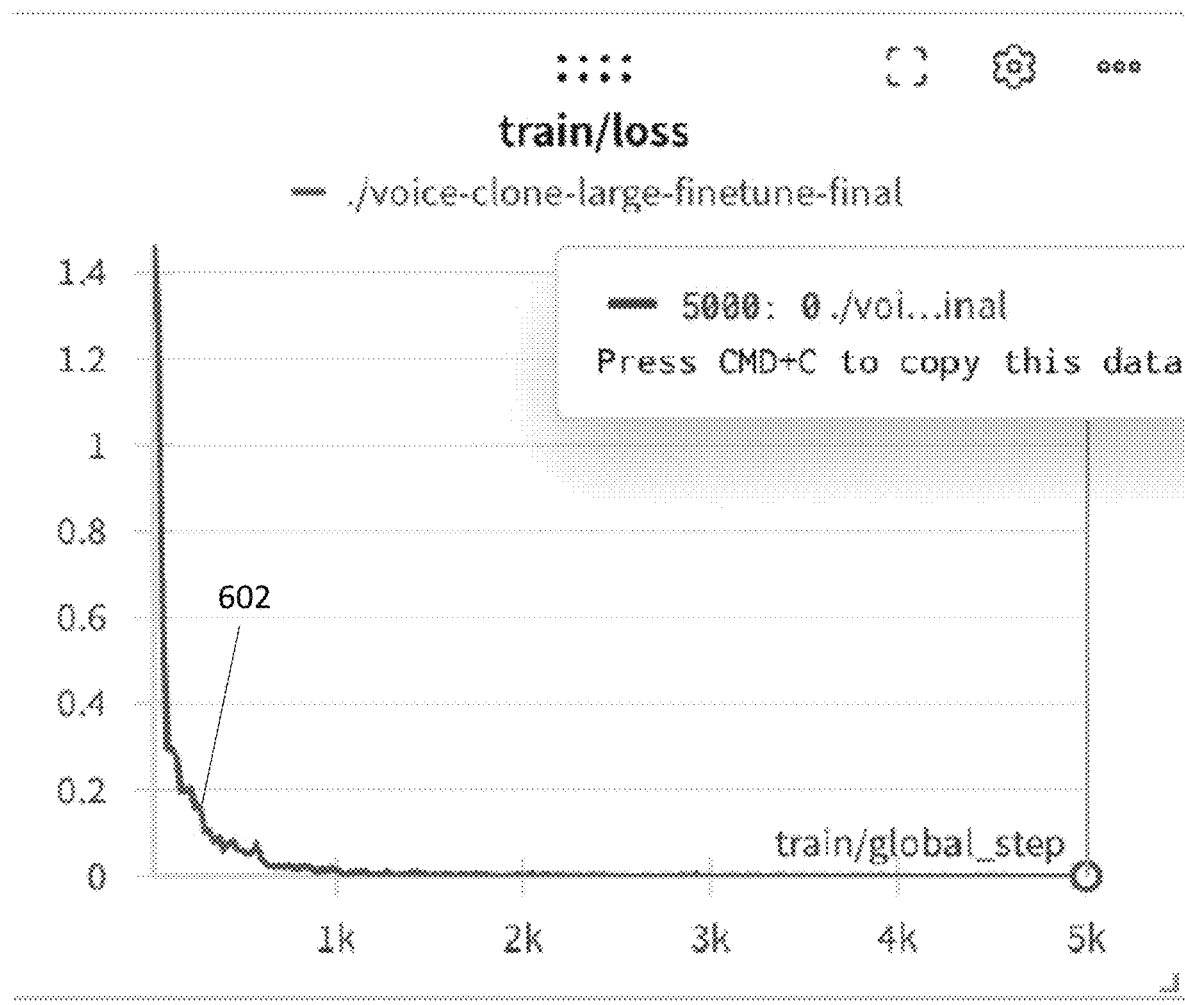
FIGS. 6A-6D are graphs of various training and evaluation metrics of a speech recognition model, including training loss (FIG. 6A), learning rate (FIG. 6B), Word Error Rate (WER) (FIG. 6C), and evaluation loss (FIG. 6D), according to at least one embodiment.
Figure 6B:
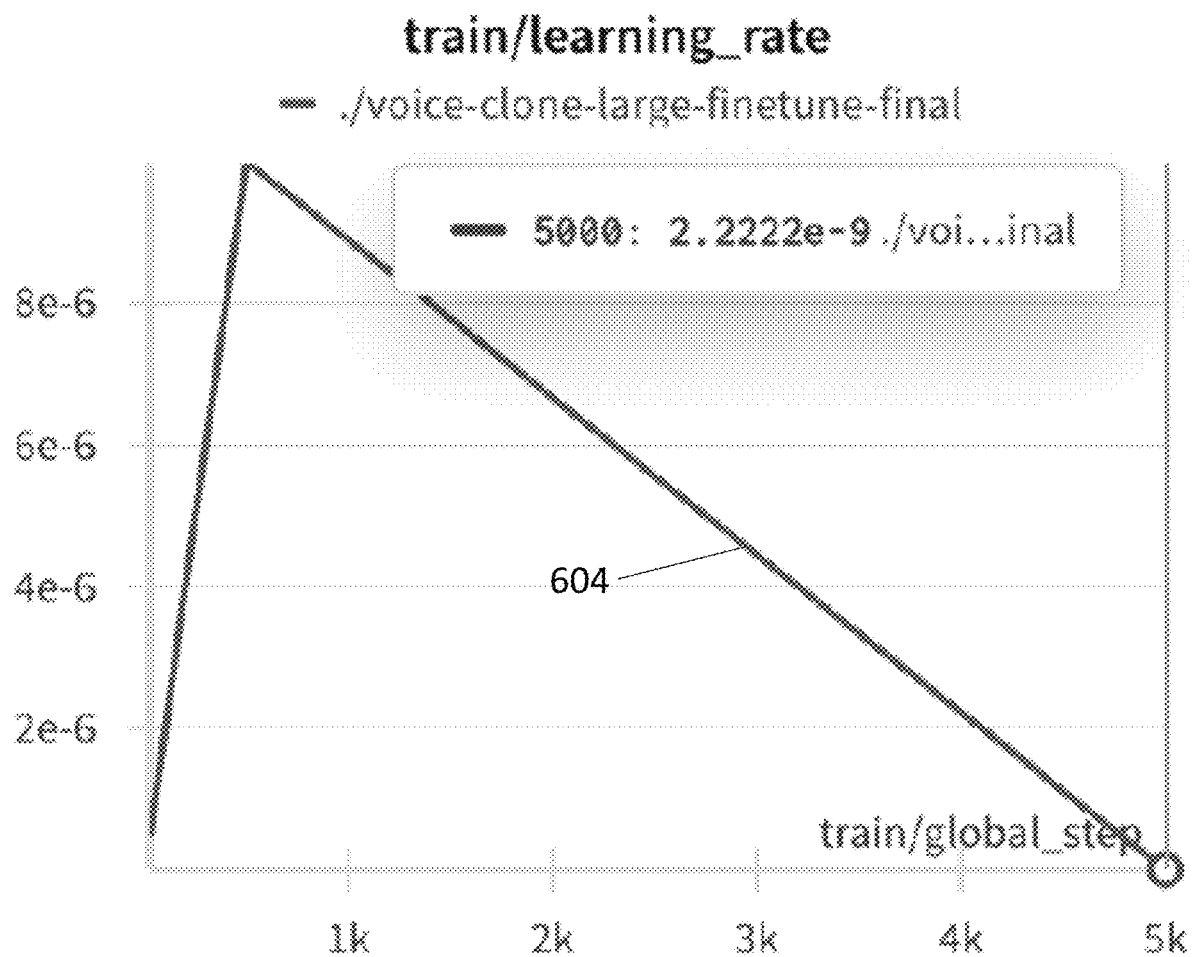
Figure 6C:
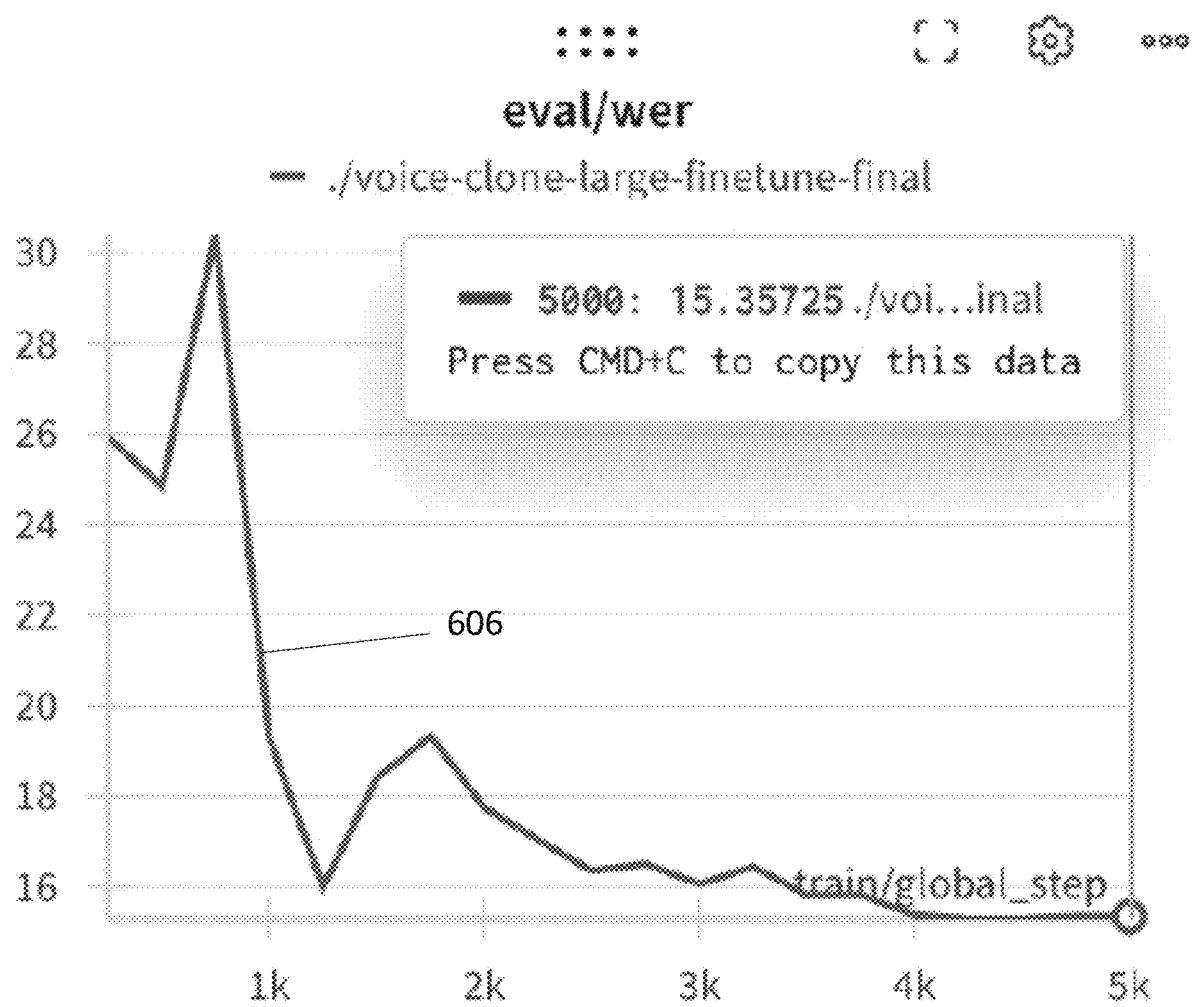
Figure 6D:
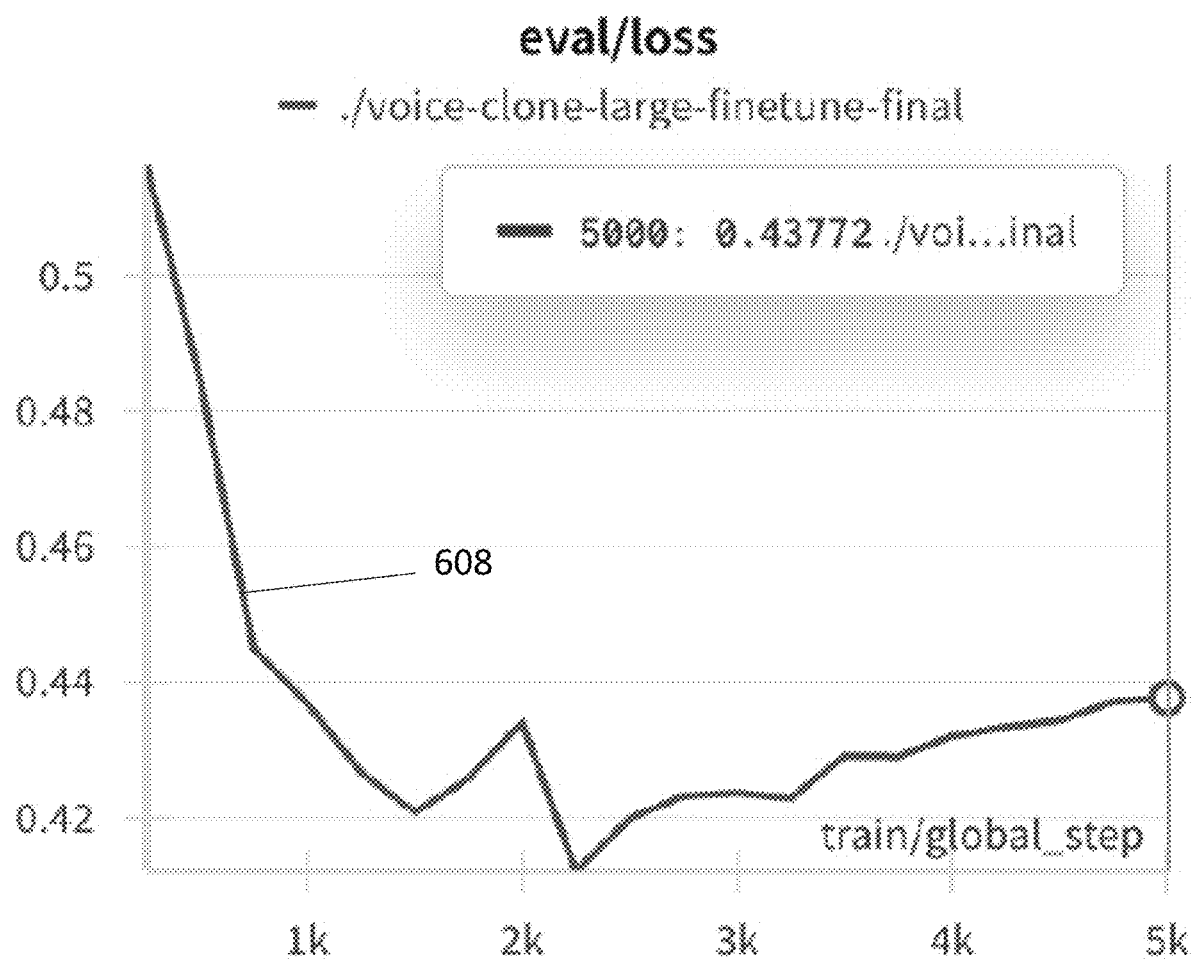
Figure 7:
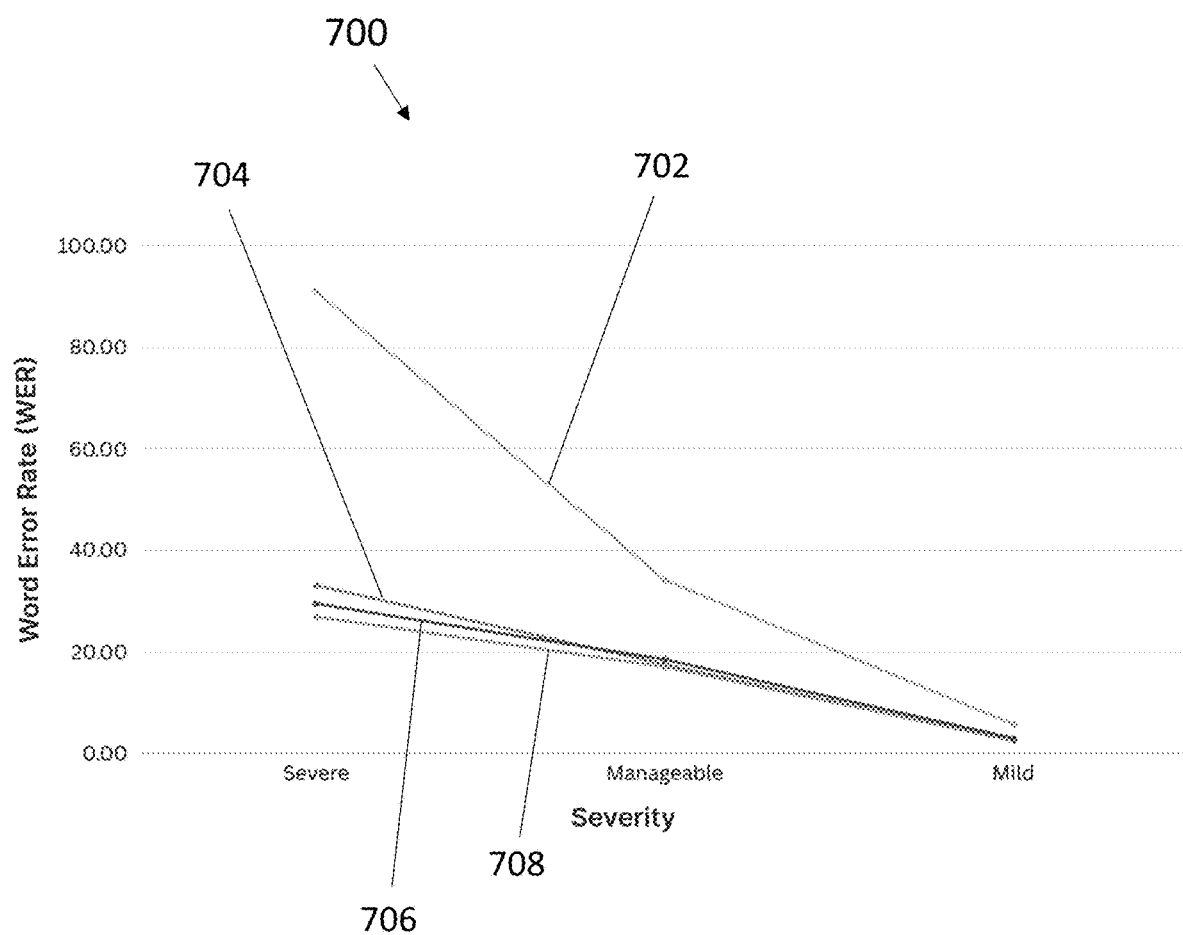
FIG. 7 is a graph showing Word Error Rate (WER) for different speech impediment severities for various speech recognition systems, according to at least one embodiment.

Turning now to FIGS. 6A-6D, graphs of various training and evaluation metrics for a speech recognition model according to at least one embodiment of the invention are shown. The graphs generally present various performance metrics during fine-tuning of a speech recognition model on dysarthric speech datasets. In FIG. 6A, curve 602 represents training loss, which steadily decreases over time (as measured by an increased number of training steps). This indicates that the model is effectively learning from the dataset and reducing prediction errors over time. In FIG. 6B, curve 604 represents learning rate, which follows a scheduled decay over time (as measured by an increased number of training steps). That is, the learning rate initially increases and then gradually decreases, showing an optimized model convergence that prevents sudden weight adjustments that could destabilize training. In FIG. 6C, curve 606 represents WER, which starts at a high value and then decreases as training progresses, showing that the model improves over time in recognizing dysarthric speech. The final WER stabilizes at about 15.357, significantly lower than the baseline (the baseline being the WER of the starting model before training, here ~26). In FIG. 6D, curve 608 represents evaluation loss, which generally declines over time (as measured by an increased number of training steps). The slight fluctuation of evaluation loss towards the end of training indicates minor variations in validation performance, however the overall trend remains stable.

In at least one embodiment, a speech recognition model according to at least one embodiment transcribed dysarthric speech into text with a reduction in WER (compared to known speech recognition systems) of about 70% for speech samples with severe impairments, about 50% for speech samples with moderate impairments, and about 54% for speech samples with mild impairments.

FIG. F 7 is a graph 700 showing the WER for different speech impediment severities (i.e., severe, moderate/manageable, and mild) for various speech recognition systems. Curve 702 represents a known speech recognition system. Curve 704 represents a first speech recognition system according to at least one embodiment, which is trained with a plurality of datasets that include speech samples from individuals with various speech impediments. Curve 706 represents a second speech recognition system according to at least one embodiment, which is trained with the aforementioned datasets and voice cloned samples of various speech impediments. Curve 708 represents a third speech recognition system according to at least one embodiment, which is trained with the aforementioned datasets and synthesized speech samples that include various speech impediments. As can be seen, the speech systems shown in curves 704, 706, and 708 outperformed the known system (curve 702) for each of the three listed speech impediment severities.

At least one embodiment of the invention comprises a method and system for communication during virtual meetings that enables one or more patients with speech disorders and/or difficulties (e.g., dysarthria) to communicate more clearly with other individuals (e.g., doctors or other health professionals).

In at least one embodiment, the method comprises prompting a user with speech disorders and/or difficulties to join a virtual meeting, automatically loading a virtual agent (e.g., an AI agent) to join the meeting, prompting one or more other individuals to join the virtual meeting, listening, by the virtual agent, to the user's speech when the user communicates with the one or more other individuals, transcribing, by the virtual agent, the user's speech into text, and repeating, by the virtual agent, the transcribed text in a synthetic voice. The virtual agent may, in at least one example, perform the transcription by using one or more speech recognition models described herein, including, for instance, models trained using dysarthric speech. Thus, the method enables the virtual agent to correct the speech deficiencies of the user and repeat the user's speech in a synthetic voice to enable the one or more other individuals to better understand the user.

In at least one example, the virtual meeting enables the user and the one or more other individuals to interact and/or communicate in real time. The meeting may also run on a secure platform or system that is compliant with necessary healthcare regulations (e.g., the U.S. federal Health Insurance Portability and Accountability Act (HIPAA), including HIPAA-compliant video infrastructure).

The system, in at least one embodiment, comprises a conversational agent, or a framework for building and/or loading conversational agents (such as, for example, Pipecat), a virtual meeting infrastructure, which preferably supports HIPAA-compliant video calls (such as Daily.co or another WebRTC-based infrastructure), a novel speech recognition and/or transcription system according to an embodiment as disclosed herein, a text-to-speech engine for generating synthetic voice vocalization from transcriptions (such as, for example, Cartesia), and an audio chunker (such as Silero-VAD) for detecting voice activity and breaking down speech into manageable chunks for processing by the speech recognition and/or transcription system. In various embodiments, each of these five elements may be implemented in hardware and/or software as a module.

Figure 8:
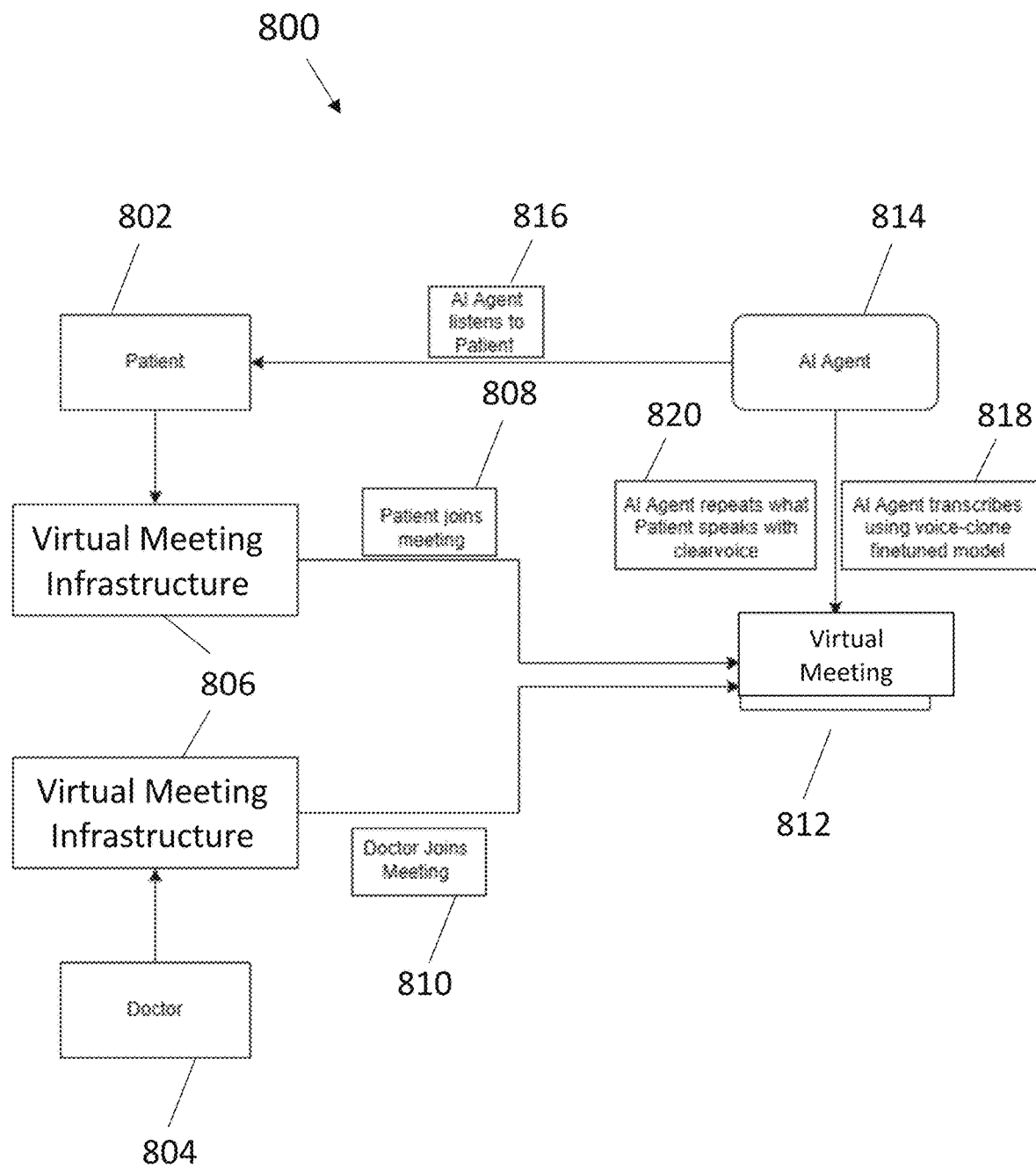
FIG. 8 is a block diagram of an architecture for communicating during virtual meetings, according to at least one embodiment.

Turning now to FIG. 8, a block diagram of an architecture 800 for communicating during virtual meetings is shown. A patient 802 and another user (in this case, a physician) 804 both access the virtual meeting infrastructure 806, for example by navigating to a domain with their browsers. At block 808, the patient then joins the meeting and enters virtual meeting 812. Similarly, at block 810, the physician joins the meeting and enters virtual meeting 812. A virtual agent (in this case, an AI agent) 814 also automatically joins the virtual meeting. During the virtual meeting, the agent listens to the patient, as shown at block 816. The agent then transcribes the patient's speech into text, as shown at block 818. Then, at block 820, the agent vocalizes the transcribed text in a synthetic voice. The physician, in at least one example, can hear the synthetic voice vocalization and/or read the transcribed text in the virtual meeting, thereby enabling the patient to more clearly communicate with the physician.

At least one embodiment of the invention comprises a method for voice-activated commands and/or activation of one or more tasks (e.g., through an Internet browser). The method comprises a user with speech disorders and/or difficulties speaking a command or request to a device or system with voice-recognition, receiving, in some embodiments by an Internet browser, the command or request, transcribing the user's speech into a text command using a novel speech recognition and/or transcription system according to an embodiment as disclosed herein, which may be integrated into the voice-recognition device or system, and executing the text command automatically. The command or request may be any request to perform a task such as, for instance, to schedule a meeting, to make an appointment, to send a message (including an e-mail message), to schedule a form of transportation (e.g., ridesharing, plane tickets, etc.), and the like.

At least one embodiment of the invention comprises a method for voice-activated control of one or more home appliances and/or smart appliances (e.g., Alexa). The method comprises a user speaking a command or request to a voice recognition agent to activate and/or control a home appliance (e.g. lights, fans), transcribing, by the voice recognition agent using a novel speech recognition and/or transcription system according to an embodiment as disclosed herein, the user's command or request to a text command, and executing the text command to activate and/or control the home appliance (e.g., via the smart appliance, such as via Alexa Skill Kit). The method may further comprise storing audio files containing the user's commands or requests, including previous commands or requests, and analyzing the stored audio files to determine the progress of the user's speech disorder and/or difficulty (e.g., improving, staying the same, becoming worse, etc.). The method may also comprise displaying, via a graphical user interface (GUI), the progress of the user's speech disorder and/or difficulty (e.g., via one or more charts, graphs, or other visual displays), e.g. on the user's mobile device, desktop computer, television, or other device able to access such content. Patient progress display may be done through a web application.

Storing of user speech samples over time, analysis of speech disorder progress, and display of progress may included in any embodiment disclosed herein where the identity of a user can be determined, for example where the user logs in to an account or uses credentials from a social media platform, etc., so that the system knows which speech samples are from the same user over time. No particular information about the user (e.g. name, etc.) need be known, as long as the system can determine that multiple speech samples over time are from the same individual.

One or more of the embodiments and/or examples described herein can be implemented on one or more computing systems, as described in further detail below.

Figure 9:
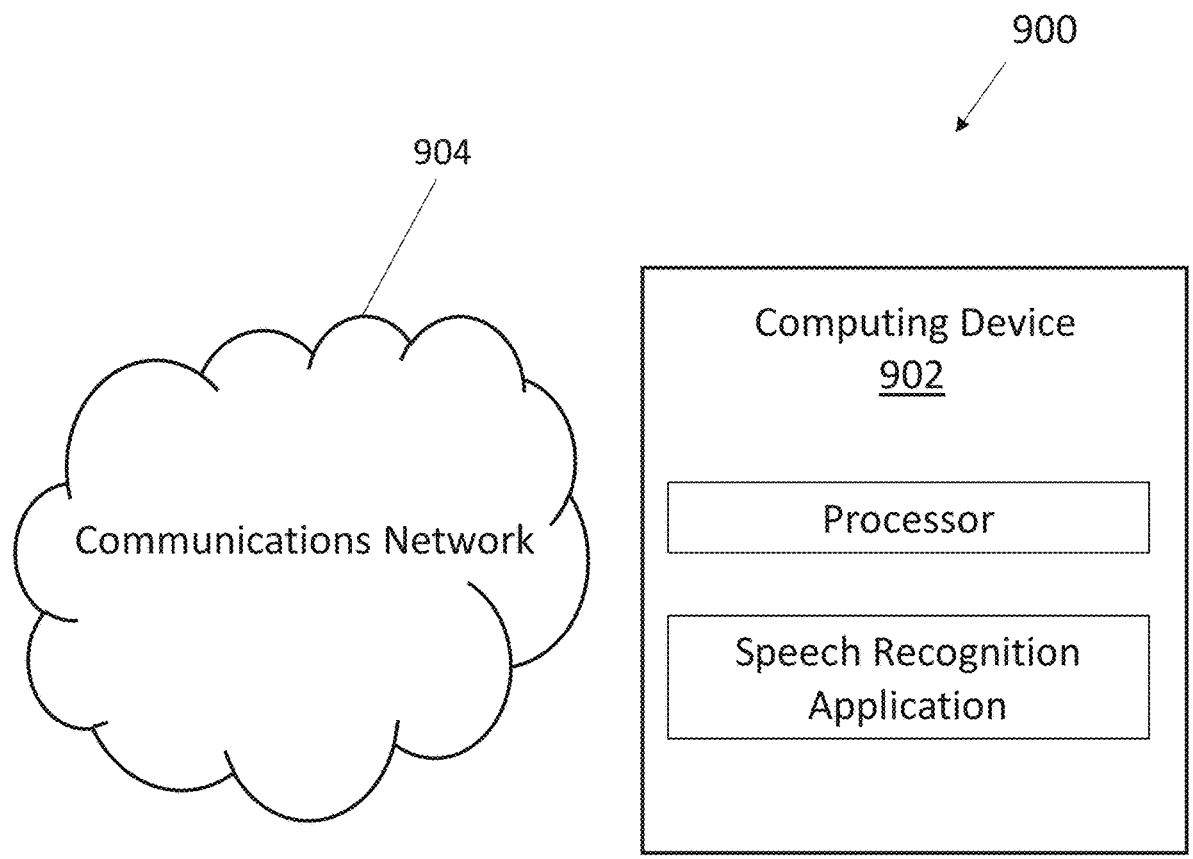
FIG. 9 is a block diagram of a computing system for speech recognition and/or transcription, according to at least one embodiment.

FIG. 9 is a block diagram of a computing system 900 for speech recognition and/or transcription, according to an example embodiment. Thus, the computing system 900 may perform, for instance, any of the steps and/or calculations described above herein.

The system 900 comprises one or more computing devices 902 that may execute one or more speech recognition applications, which perform speech recognition and/or transcription. Additionally, the applications can be used to send information to, or receive information from, a specific user or users. The applications can further be capable of scheduled or triggered communications or commands when various events occur (e.g., when the user wants to record or re-record a speech sample, when the user wants to display a transcribed speech sample, etc.).

The one or more computing devices 902 can be used to store acquired computational data, as well as other data in memory and/or a database. The memory may be communicatively coupled to one or more hardware processing devices.

The one or more computing devices 902 may further be connected to a communications network 904, which can be the Internet, an intranet, or another wired or wireless communication network. For example, the communication network 904 may include a Mobile Communications (GSM) network, a code division multiple access (CDMA) network, $3^{rd}$ Generation Partnership Project (GPP) network, an Internet Protocol (IP) network, a wireless application protocol (WAP) network, a Wi-Fi network, a satellite communications network, or an IEEE 802.11 standards network, as well as various communications thereof. Other conventional and/or later developed wired and wireless networks may also be used.

The one or more computing devices 902 include at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions related to the speech recognition application. In addition, the one or more computing devices 902 further include at least one communications interface to transmit and receive communications, messages, and/or signals.

Thus, information processed by the one or more computing devices 902, or the applications executed thereon, may be sent to another computing device, such as a remote computing device, via the communication network 904.

Figure 10:
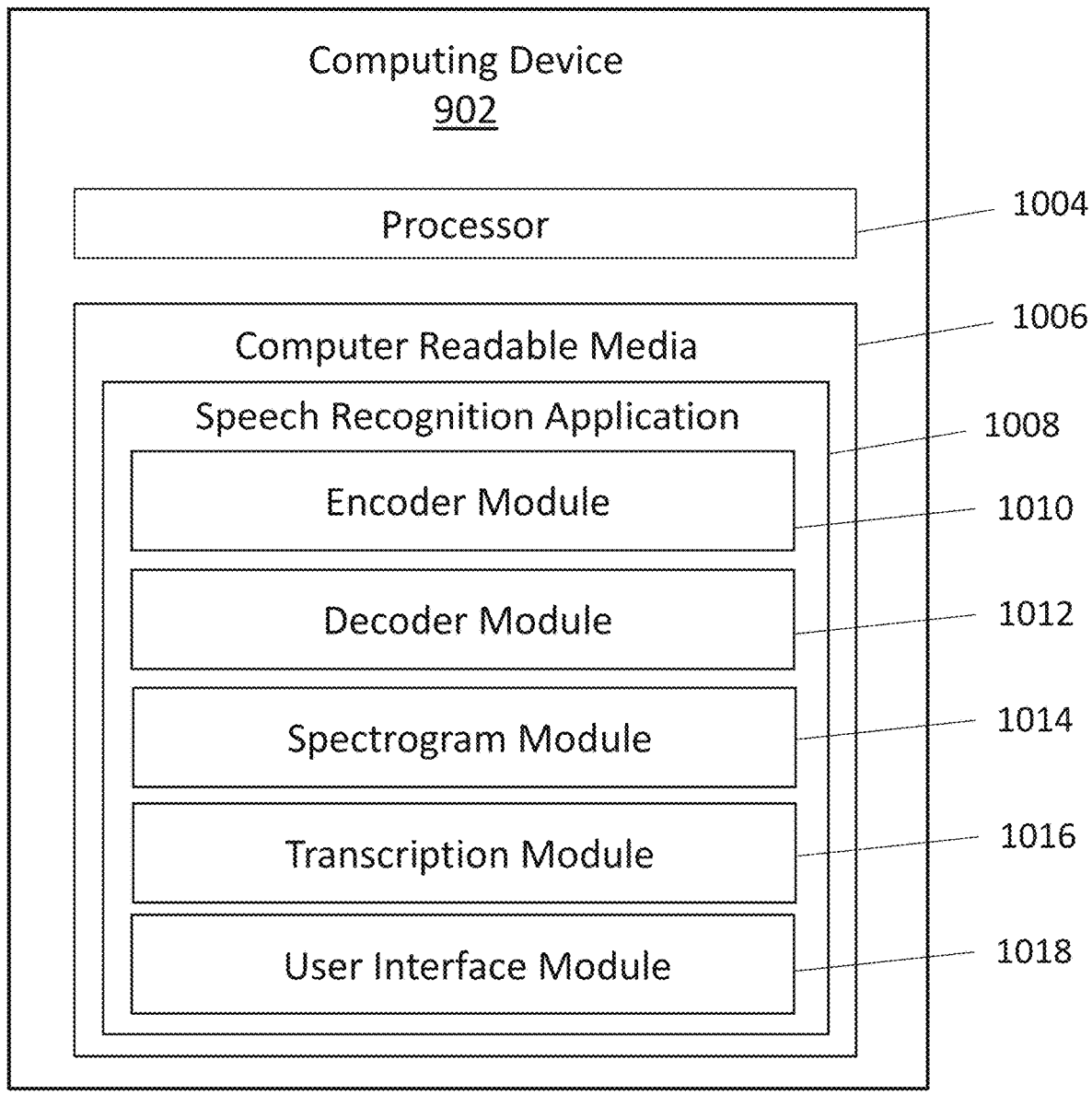
FIG. 10 is a block diagram of a computing device, according to at least one embodiment.

FIG. 10 illustrates a block diagram of a computing device 902 according to an example embodiment. The computing device 902 includes computer readable media (CRM) 1006 in memory on which a speech recognition application 1008 or other user interface or application is stored. The computer readable media may include volatile media, nonvolatile media, removable media, non-removable media, and/or another available medium that can be accessed by the processor 1004. By way of example and not limitation, the computer readable media comprises computer storage media and communication media. Computer storage media includes non-transitory storage memory, volatile media, nonvolatile media, removable media, and/or non-removable media implemented in a method or technology for storage of information, such as computer/machine-readable/executable instructions, data structures, program modules, or other data. Communication media may embody computer/machine-readable/executable instructions, data structures, program modules, or other data and include an information delivery media or system, both of which are hardware.

The speech recognition application 1008 can include an encoder module 1010 for encoding, a decoder module 1012 for decoding, a spectrogram module 1014 for representing a voice signal's loudness or amplitude, a transcription module 1016 for transcribing speech, and a user interface module 1018 for displaying a speech transcription and other options for users. One or more of the aforementioned modules may also be operable to obtain data from other sources, such as a user, a database, and the like, and to process that data to correct for imperfect, inaccurate, or absent datasets relating to speech recognition and/or transcription.

Using a local high-speed network, the computing device 902 may receive the aforementioned data in near real time, process the data, and generate speech transcriptions. These transcriptions may be executed by one or more speech recognition models within the speech recognition application 1008 or other stored applications.

Measured or calculated data may be monitored to generate an event and an alert if something is out of range (e.g., if there is an error with one or more datasets used for speech recognition and/or transcription, if a user makes an error with recording their speech, etc.). As mentioned herein, an alert may also be sent after one or more transcriptions has been finished and/or displayed. Such alerts may be sent in real-time or near real-time using an existing uplink or dedicated link. The alerts may be sent using email, SMS, push notification, or using an online messaging platform to end users and computing devices, among others.

The speech recognition application 1008 may provide data visualization using a user interface module 1018 for displaying a user interface on a display device. As an example, the user interface module 1018 generates a native and/or web-based graphical user interface (GUI) that accepts input and provides output viewed by users of the computing device 902. The computing device 902 may provide real-time automatically and dynamically refreshed information on speech samples, recognition of the speech samples, transcription of the speech samples, and the like. The user interface module 1018 may send data to other modules of the speech recognition application 1008 of the computing device 902, and retrieve data from other modules of the speech recognition application of the computing device 902 asynchronously without interfering with the display and behavior of the user interface displayed by the computing device 902.

Figure 11:
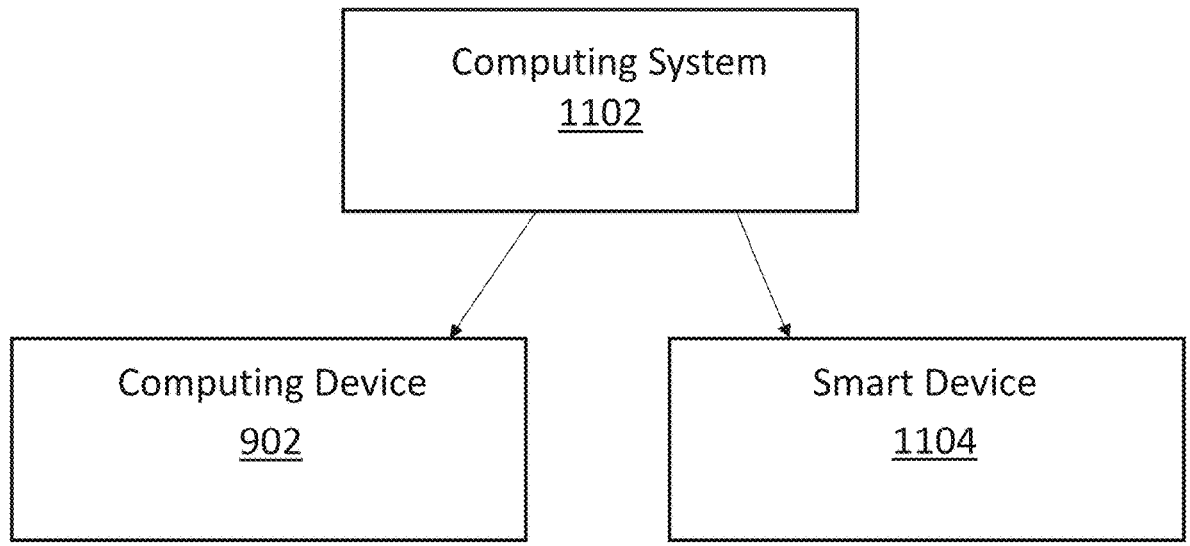
FIG. 11 shows an example of a system for implementing certain aspects of the present technology, according to at least one embodiment.

Further, one or more computing systems can implement one or more aspects of the technology and/or systems described herein. FIG. 11 shows an example of such a computing system 1102, which may include one or more computing devices (e.g., computing device 902) and/or processing units, which include one or more processors and software. The one or more computing devices (e.g., computing device 902) may execute one or more applications, such as, for example, the speech recognition application 1008 described above herein, or one or more portions thereof. The computing system 1102 may further control, monitor, and/or extract data from, for instance, a smart device 1104 (e.g., IoT devices, smart lights, smart appliances, doors, home assistants, and the like). The computing system can further comprise a graphical user interface (GUI) so that a user may control the system or portions thereof, such as, for instance, the smart device 1104.

Figure 12:
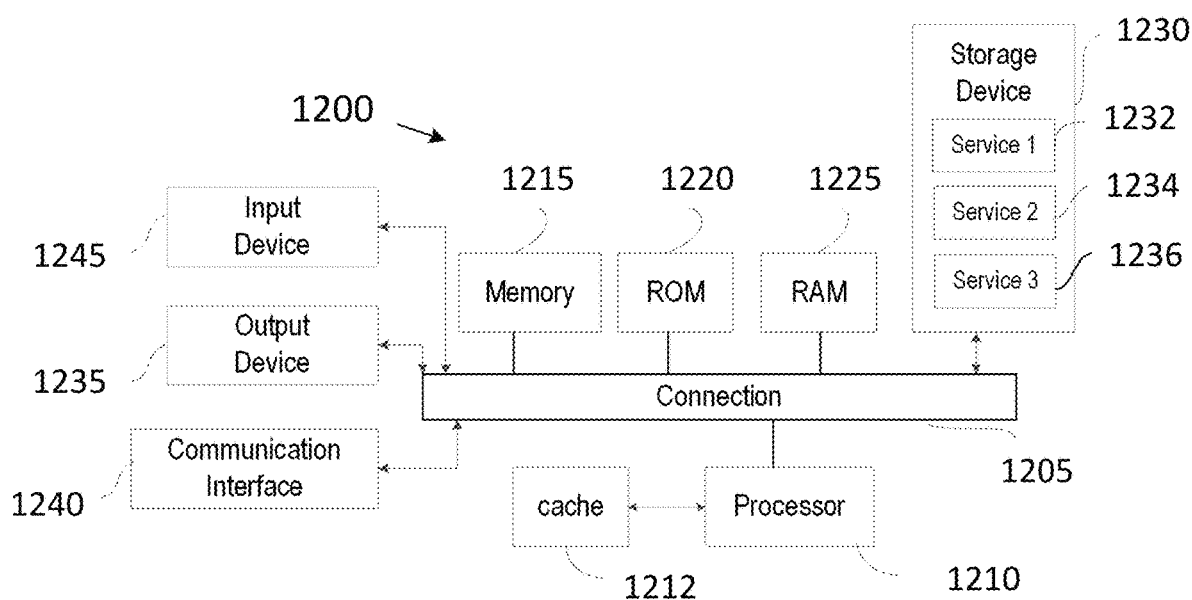
FIG. 12 shows a further example of a system for implementing certain aspects of the present technology, according to at least one embodiment.

FIG. 12 shows an example of computing system 1200, which can be for example any computing device such as the computing device 902, or any component thereof in which the components of the system are in communication with each other using connection 1205. Connection 1205 can be a physical connection via a bus, or a direct connection into processor 1210, such as in a chipset architecture. Connection 1205 can also be a virtual connection, networked connection, or logical connection.

In some embodiments, computing system 1200 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1200 includes at least one processing unit (CPU or processor) 1210 and connection 1205 that couples various system components including system memory 1215, such as read-only memory (ROM) 1220 and random access memory (RAM) 1225 to processor 1210.

Computing system 1200 can include a cache of high-speed memory 1212 connected directly with, in close proximity to, or integrated as part of processor 1210.

Processor 1210 can include any general purpose processor and a hardware service or software service, such as services 1232, 1234, and 1236 stored in storage device 1230, configured to control processor 1210 as well as a special-purpose processor where software instructions are incorporated into the actual processor design. Processor 1210 may essentially be a completely self-contained computing system, containing multiple cores or processors, a bus, memory controller, cache, etc. A multi-core processor may be symmetric or asymmetric.

To enable user interaction, computing system 1200 includes an input device 1245, which can represent any number of input mechanisms, such as a microphone for speech, a touch-sensitive screen for gesture or graphical input, keyboard, mouse, motion input, speech, etc. Computing system 1200 can also include output device 1235, which can be one or more of a number of output mechanisms known to those of skill in the art. In some instances, multimodal systems can enable a user to provide multiple types of input/output to communicate with computing system 1200. Computing system 1200 can include communications interface 1240, which can generally govern and manage the user input and system output. There is no restriction on operating on any particular hardware arrangement, and therefore the basic features here may easily be substituted for improved hardware or firmware arrangements as they are developed.

Storage device 1230 can be a non-volatile memory device and can be a hard disk or other types of computer readable media which can store data that are accessible by a computer, such as magnetic cassettes, flash memory cards, solid state memory devices, digital versatile disks, cartridges, random access memories (RAM s), read-only memory (ROM), and/or some combination of these devices.

The storage device 1230 can include software services, servers, services, etc., that when the code that defines such software is executed by the processor 1210, it causes the system to perform a function. In some embodiments, a hardware service that performs a particular function can include the software component stored in a computer-readable medium in connection with the necessary hardware components, such as processor 1210, connection 1205, output device 1235, etc., to carry out the function.

For clarity of explanation, in some instances, the present technology may be presented as including individual functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the disclosures herein (e.g., speech recognition and/or transcription) can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, Universal Serial Bus (USB) devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Embodiments of the present disclosure will be further understood by reference to the following non-limiting examples.

EXAMPLES

The below examples set forth various speech recognition systems, models, and scenarios, each according to at least one embodiment of the invention.

Example 1: Fine-Tuning a Speech Recognition Model

Method

A speech recognition model was fine-tuned using Hindi datasets for training, validation, and testing. Specifically, datasets were loaded and unwanted columns were removed. The data was then prepared by converting all audio files to 16 kilohertz (KHZ), and training and evaluation parameters were set. The Word Error Rate (WER) was calculated after training the model. The model was trained for about 2.3 hours based on the learning rate=1e-5, maximum steps=4000, and evaluation steps=1000.

Results

The model training loss reached zero at 4000 steps and validation loss of about 0.4390. At this point, the model was no longer able to learn anything new. Thus the WER at 4000 steps would be the lowest/most optimal, which was calculated to be about 32.4, meaning that about 32.4% of the transcriptions were erroneous at some point, with a validation loss of about 0.4390, meaning that when validating the model to the validation set, about 43.90% of transcriptions were incorrect.

Example 2: Testing and Analyzing a Speech Recognition Model

Method

A speech recognition model was tested and analyzed using datasets with predominantly one word utterances. Speech impediment severities were classified based on a transcription accuracy metric. Transcription was performed using a prior art speech transcription model that transcribes the speech samples and calculates WER to measure intelligibility. The classifications of dysarthric patients in terms of speech intelligibility were 0-40%=severe (2 patients, with about 5185 tested files), 40-80%=moderate or manageable (2 patients, with about 2847 tested files), and greater than 80%=mild (2 patients, with about 10,711 tested files). Classification of speech disorder severity may be based on speech intelligibility percentage and expert clinical assessments, and is a rubric commonly used in research and clinical settings (e.g., as part of standardized speech assessments performed by speech-language pathologists or through speech recognition evaluations). For instance, severe speech intelligibility means that intelligibility is low and the speaker is hard to understand even with effort, moderate intelligibility means that the speech is partially intelligible with some clarity but still difficult to comprehend, and mild intelligibility means that the speaker has noticeable (but minimal) impairment. Classifications of individuals may be determined using known standardized speech assessments performed by speech-language pathologists or ASR evaluations. In the training phase, ground truth transcriptions from various datasets are used for accuracy comparisons, and human annotators (e.g., researchers or clinicians) may also verify the transcriptions for evaluation purposes. Classification can be performed using transcription by a fine-tuned model according to an embodiment of the present invention, with appropriate adjustments of the percentage thresholds for classifications, because while the absolute error rate decreases with the fine-tuned model, the differences in error rate between classes is mainly preserved.

Results

Overall, the WER for all scales was about 127.57 (testing time was about 1.45 hours total). For severe dysarthric speech, WER was about 142.57 (testing time was about 31 minutes), for manageable dysarthric speech, WER was about 163.77 (testing time was about 13 minutes), and for mild dysarthric speech, WER was about 110.68 (testing time was about 50 minutes). The WER for this model was high for all severities with manageable being the highest.

Example 3: Testing and Analyzing a Speech Recognition Model with a One Word Dataset Method A one word dataset was divided into severe, manageable, and mild, as for the model tested in Example 2. For severe patients, about 2476 tested files were used. For manageable patients, about 470 tested files were used. For mild patients, about 1942 tested files were used.

Results

Overall, the WER was about 108.65 with a testing time of about 21 minutes. For severe dysarthric speech, the WER was about 122.95 with a testing time of about 13 minutes. For manageable dysarthric speech, the WER was about 114.71 with a testing time of about 2 minutes. Lastly, for mild dysarthric speech, the WER was about 86.24 with a testing time of about 8 minutes.

Example 4: Testing and Analyzing a Speech Recognition Model with Multiple Word Utterances Method A dataset with multiple word utterances was divided into severe (about 145 tested files), manageable (about 140 tested files), and mild (about 169 tested files), for a total number of 454 tested files.

Results

Overall, the WER was about 43.17, with a tested time of about 4 minutes. For severe impediments, the WER was about 90.95 with a tested time of about 2 minutes. For manageable impediments, the WER was about 34.08 with a tested time of about 1 minute. For mild impediments, the WER was about 5.74 with a tested time of about 1 minute.

Example 5: Fine-Tuning, Training, and Testing of a Speech Recognition Model

Method

A speech recognition model was fine-tuned by training and validating with a dataset. Fine-tuning proceeded in a similar manner to previous examples. Specifically, in this example, max steps was set to 5000 and batch size was set to 16. After running for 5000 steps with effective batch size of 16, the number of audio files the model sees is 5000*16, which translates to 2 epochs. Other parameters may be the same as or similar to those used in one or more other examples provided. A total number of 38,700 files from 9 patients was used for training, and a total number of 18,700 files from 6 patients was used for testing.

Results

The training loss was zero around 4000 steps with a validation loss of about 0.3797 at 4250 steps because the graph started overfitting (lowering its evaluation loss to zero and then going up again after a certain amount of steps). Large models have a tendency to overfit (that is, the training loss reduces but evaluation loss keeps increasing). This means that the model is learning something specific to the dataset, which can reduce generalizability. The lowest evaluation loss was at around 1000 steps.

Example 6: Fine-Tuning, Training, and Testing of a Speech Recognition Model

Method

Compared with Example 5, the number of max steps was reduced to about 1500. The number of evaluation steps was also reduced to around 100. The model was trained for about 6.5 hours with a learning rate of about 1e-5. The example utilized a total number of 38,700 files from 9 patients for training, and a total number of 18,700 files from 6 patients for testing.

Results

Training loss approached zero (meaning the model was no longer able to learn anything new) with a validation loss of about 0.2762 at around 1500 steps. At the end of training, the WER was about 28.41, meaning that 28.41% of the transcriptions were erroneous at some point, and the validation loss was about 0.2762.

Example 7: Fine-Tuning and Testing of a Speech Recognition Model

Method

A speech recognition model was tested with a dataset having one word utterances. Patient classifications remain the same as prior examples (i.e., severe, manageable/moderate, mild), but no training dataset was used. The number of files used was about 5185 for severe impediments, about 2847 for moderate impediments, and about 10,711 for mild impediments.

Results

The WER was about 81.13 for severe impediments, with a tested time of about 31 minutes, about 18.34 for moderate impediments, with a tested time of about 13 minutes, and about 5.56 for mild impediments, with a tested time of about 50 minutes. This equates to a WER of about 43.1% less than conventional models for severe impediments, about 88.8% less than conventional models for moderate impediments, and about 95% less than conventional models for mild impediments.

Example 8: Testing a Speech Recognition Model

Method

A speech recognition model was tested with another dataset having one word utterances. Patient classifications remain the same as prior examples (i.e., severe, manageable/moderate, mild). The number of files used was about 2476 for severe impediments, about 470 for moderate impediments, and about 1942 for mild impediments.

Results

The WER was about 76.53 for severe impediments, with a tested time of about 13 minutes, about 70.53 for moderate impediments, with a tested time of about 2 minutes, and about 49.87 for mild impediments, with a tested time of about 8 minutes. This equates to a WER of about 37.8% less than conventional models for severe impediments, about 38.5% less than conventional models for moderate impediments, and about 42.2% less than conventional models for mild impediments/

Example 9: Fine-Tuning, Training, and Validating a Speech Recognition Model

Method

A speech recognition model was fine-tuned and validated with a dataset having imperative sentences (that is, sentences with at least 3 words). Specifically, datasets were loaded and unwanted columns were removed. The data was then prepared by converting all audio files to 16 kilohertz (KHZ), and training and evaluation parameters were set. The Word Error Rate (WER) was calculated after training the model. The model was trained for about 1.5 hours based on the learning rate=1e-5, maximum steps=1000, and evaluation steps=100. One epoch equaled about 53 steps with an effective batch size of 16. A dataset of about 854 files was used for training, and a dataset of about 454 files was used for validation.

Results

Training loss reached zero (meaning the model was no longer able to learn anything new) with a validation loss of about 0.4678, with the most optimal stage at about 1000 steps, after which the WER did not improve. At the end, the WER was about 18.77, meaning that 18.77. % of the transcriptions were erroneous at some point, and the validation loss was about 0.4678.

Example 10: Testing and Analyzing a Speech Recognition Model with Multiple Word Utterances Method A speech recognition model was tested with a dataset containing multiple word utterances. The dataset consisted of about 145 files for severe impediments, about 140 files for manageable impediments, and about 169 files for mild impediments. Finally the WER tested was compared with the publicly available model tested on imperative sentences.

Results

The WER for transcription of severe impediments was about 33.04 with a tested time of about 2 minutes, about 17.52 for manageable impediments with a tested time of about 1 minute, and about 2.5 for mild severities with a tested time of about 1 minute. The WER was about 63.7% less than the conventional model for severe impediments, about 48.5% less for manageable impediments, and about 56.44% less for mild impediments.

Example 11: Fine-Tuning a Speech Recognition Model with Voice Cloning

Method

A speech recognition model was trained and validated with a dataset that included both multiple utterances and voice cloned samples. Voice cloned samples were generated as previously described herein. There were about 4724 voice cloned samples and about 854 imperative sentences, resulting in about 5600 total samples. The model was trained for about 3.5 hours.

Results

Training loss reached zero with validation loss of about 0.4377 at about 5000 steps. The WER was about 15.36, meaning that 15.36% of the transcriptions were incorrect at some point.

Example 12: Testing and Analyzing a Speech Recognition Model with Multiple Word Utterances Method A speech recognition model was tested with about 454 files total, with about 145 files for severe impediments, about 140 files for manageable impediments, and about 169 files for mild impediments.

Results

The WER for the transcription of severe impediments was about 26.89 with a tested time of about 2 minutes, about 17.04 for manageable impediments with a tested time of about 1 minute, and about 2.66 for mild impediments with a tested time of about 1 minute. The WER was about 70.04% less than a publicly available model for severe impediments, about 33.58% less than the publicly available model for manageable impediments, and about 53.6% less than the publicly available model for mild impediments.

Example 13: Fine-Tuning a Speech Recognition Model with Synthesized Speech Samples Method A speech recognition model as trained and validated with a dataset including both multiple utterances and synthesized speech samples. Synthesized speech samples were generated as previously described herein. No manual preprocessing was required. The model was trained with about 5124 files for about 3.5 hours.

Results

Training loss reached zero with a validation loss of about 0.4259 at about 5000 steps. The WER was about 16.8396, meaning that 16.8396% of the transcriptions were incorrect at some point. The model's WER reduces drastically up to about 4200 steps.

Example 14: Testing and Analyzing a Speech Synthesis Model with Multiple Word Utterances Method A speech synthesis model was tested with a dataset including imperative sentences. The testing dataset included about 454 files, with about 145 files of severe impediments, about 140 files of manageable impediments, and about 169 files of mild impediments.

Results

The WER for transcribing severe impediments was about 29.44 with a tested time of about 4 minutes, about 18.49 for manageable impediments with a tested time of about 1 minute, and about 3 for mild impediments with a tested time of about 1 minute. The WER was about 9.5% less than a conventional model for severe impediments, about 8.5% less than the conventional model for moderate impediments, and about 12.8% less than the conventional model for mild impediments.

These and other objectives and features of the invention are apparent in the disclosure, which includes the above and ongoing written specification.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

The invention is not limited to the particular embodiments illustrated in the drawings and described above in detail. Those skilled in the art will recognize that other arrangements could be devised. The invention encompasses every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application. While the invention has been described with reference to specific illustrative embodiments, modifications and variations of the invention may be constructed without departing from the spirit and scope of the invention as set forth in the following claims.

What is claimed is:

1. A system for impaired speech recognition and/or transcription, comprising:
    a memory storing computer-readable instructions; and
    at least one processor to execute the computer-readable instructions to:
        train, by a plurality of datasets comprising a plurality of speech samples, a speech recognition model;
        stop the training of the speech recognition model when a word error rate (WER) parameter of the speech recognition model stabilizes;
        record a user's voice to generate a voice recording;
        process the voice recording to generate a processed voice recording;
        input the processed voice recording to the speech recognition model;
        transcribe, by the speech recognition model, the processed voice recording to generate a transcribed output; and
        display, via a graphical user interface (GUI), the transcribed output;
    wherein the speech recognition model is trained using a plurality of datasets comprising a plurality of speech samples, wherein the plurality of speech samples comprise speech samples from patients with a speech impairment, and wherein the speech impairment comprises dysarthria.

2. The system of claim 1, wherein the plurality of speech samples comprise a plurality of voice cloned samples and/or a plurality of synthesized speech samples, and wherein the plurality of voice cloned samples and/or the plurality of synthesized speech samples exhibit the speech impairment.

3. The system of claim 1, wherein the speech recognition model is tested on one or more test datasets comprising a plurality of test samples, and wherein the plurality of test samples are different than the plurality of speech samples.

4. The system of claim 1, wherein the plurality of speech samples comprise both one word utterances and multiple word utterances.

5. The system of claim 1, wherein the plurality of speech samples comprise:
    a first subset of samples containing severe speech impediments such that between about 0% and about 40% of speech in the first subset of samples is intelligible;
    a second subset of samples containing moderate speech impediments such that between about 40% and about 80% of speech in the second subset of samples is intelligible; and
    a third subset of samples containing mild speech impediments such that between about 80% and about 100% of speech in the third subset of samples is intelligible.

6. The system of claim 1, wherein the speech impairment further comprises one or more disorders selected from the group consisting of: dysphagia, apraxia, Parkinson's disease, amyotrophic lateral sclerosis (ALS), cerebral palsy, aphasia, and combinations thereof.

7. A system for impaired speech recognition and/or transcription, comprising:
    a memory storing computer-readable instructions; and
    at least one processor to execute the computer-readable instructions to:
        record a user's voice to generate a voice recording;
        process the voice recording to generate a processed voice recording;
        input the processed voice recording to a speech recognition model;
        train, by a plurality of datasets comprising a plurality of speech samples, the speech recognition model;
        transcribe, by the speech recognition model, the processed voice recording to generate a transcribed output; and
        stop the training of the speech recognition model when a word error rate (WER) parameter of the speech recognition model stabilizes,
    wherein the user has a speech impairment, wherein the speech impairment comprises dysarthria, and wherein the plurality of speech samples comprise speech samples from patients with the speech impairment.

8. The system of claim 7, wherein the WER parameter stabilizes when the WER parameter changes by less than about 0.5% for three consecutive testing checkpoints.

9. The system of claim 7, wherein the at least one processor executes the computer-readable instructions to further:
reduce the WER parameter by optimizing the speech recognition model's learning rate, batch size, and gradient accumulation.

10. The system of claim 7, wherein, during the training of the speech recognition model, the speech recognition model is tested for a word error rate (WER) parameter for each of:
a first subset of samples containing severe speech impediments such that between about 0% and about 40% of speech in the first subset of samples is intelligible;
a second subset of samples containing moderate speech impediments such that between about 40% and about 80% of speech in the second subset of samples is intelligible; and
a third subset of samples containing mild speech impediments such that between about 80% and about 100% of speech in the third subset of samples is intelligible.

11. The system of claim 7, wherein the training of the speech recognition model is conducted with:
a learning rate between about 0.0001 and about 0.000001;
a batch size between about 2 and about 32;
gradient accumulation steps of about 2;
warmup steps of about 500;
maximum steps between about 4,000 to about 5,000; and/or
steps between evaluation checkpoints of about 250.

12. The system of claim 7, wherein the voice recording comprises at least one task request from the user, and wherein at least one processor executes the computer-readable instructions to further:
execute, by the transcribed output, the at least one task request.

13. The system of claim 12, wherein the at least one task request comprises a command to send a message, a command to activate a device, and/or a command to schedule a task.

14. The system of claim 13, wherein executing the at least one task request comprises carrying out automated workflows via an Internet browser.

15. The system of claim 7, wherein the at least one processor executes the computer-readable instructions to further:
save the transcribed output;
compare the transcribed output with at least one previous transcription of speech of the user; and
determine, based on the comparison, progression of the user's speech impairment.

16. The system of claim 15, wherein the at least one processor executes the computer-readable instructions to further:
display information regarding the determined progression of the user's speech impairment.

17. A system for impaired speech recognition and/or transcription, comprising:
a memory storing computer-readable instructions; and
at least one processor to execute the computer-readable instructions to:
train, by a plurality of datasets comprising a plurality of speech samples, a speech recognition model;
stop the training of the speech recognition model when a word error rate (WER) parameter of the speech recognition model stabilizes;
automatically load a virtual agent to join a virtual meeting between a user with a speech impairment and at least one individual other than the user;
listen, by the virtual agent, to the user's speech when the user communicates to the at least one individual during the virtual meeting;
transcribe, by the speech recognition model, the user's speech into a transcribed output; and
repeating, in a synthesized voice by the virtual agent, the transcribed output;
wherein the plurality of speech samples comprise speech samples from patients with the speech impairment, and wherein the speech impairment comprises dysarthria.

18. The system of claim 17, wherein the at least one processor executes the computer-readable instructions to further:
display, via a graphical user interface (GUI), the transcribed output to the user and the at least one individual.

19. The system of claim 17, wherein the virtual agent is artificially intelligent, and wherein the virtual meeting is hosted on a secure platform compliant with one or more healthcare privacy regulations.

* * * * *